United States Patent
Matsushita

(10) Patent No.: US 11,821,736 B2
(45) Date of Patent: Nov. 21, 2023

(54) METHOD FOR SELECTING ROUTE, TERMINAL, SYSTEM FOR SELECTING ROUTE, AND PROGRAM

(71) Applicant: Faurecia Clarion Electronics Co., Ltd., Saitama (JP)

(72) Inventor: Yuki Matsushita, Saitama (JP)

(73) Assignee: Faurecia Clarion Electronics Co., Ltd., Saitama (JP)

(*) Notice: Subject to any disclaimer, the term of this patent is extended or adjusted under 35 U.S.C. 154(b) by 199 days.

(21) Appl. No.: 17/296,328

(22) PCT Filed: Dec. 19, 2019

(86) PCT No.: PCT/JP2019/049838
§ 371 (c)(1),
(2) Date: May 24, 2021

(87) PCT Pub. No.: WO2020/137806
PCT Pub. Date: Jul. 2, 2020

(65) Prior Publication Data
US 2022/0042809 A1  Feb. 10, 2022

(30) Foreign Application Priority Data

Dec. 28, 2018 (JP) ................... 2018-246694

(51) Int. Cl.
*G01C 21/34* (2006.01)
*G01C 21/36* (2006.01)

(52) U.S. Cl.
CPC ..... *G01C 21/3423* (2013.01); *G01C 21/3694* (2013.01)

(58) Field of Classification Search
CPC ............ G01C 21/3423; G01C 21/3694; G01C 21/3676; G01C 21/3407; B60W 2050/146;

(Continued)

(56) References Cited

U.S. PATENT DOCUMENTS

2005/0021227 A1* 1/2005 Matsumoto ........ G01C 21/3415
                                                                    701/431
2008/0183378 A1* 7/2008 Weidner ................. G01C 21/20
                                                                    701/533
(Continued)

FOREIGN PATENT DOCUMENTS

DE  102014224454 A1 *  6/2016 ......... B62D 15/0285
JP     2002296071 A      10/2002
(Continued)

OTHER PUBLICATIONS

Machine Translation DE 102014224454 (Year: 2016).*
(Continued)

*Primary Examiner* — Anne Marie Antonucci
*Assistant Examiner* — Wesam Almadhrhi
(74) *Attorney, Agent, or Firm* — IP BUSINESS SOLUTIONS, LLC

(57) ABSTRACT

The on-board apparatus 50 calculates an automated driving route of the vehicle 55 from the parking space of the vehicle 55 to the destination and an estimated time required to reach the destination in the case in which the vehicle 55 drives by automated driving by following the automated driving route. The server apparatus 30 calculates a walking travel route in the case of traveling by walk from the position of the terminal apparatus 10 to the parking space of the vehicle 55 and an estimated time required to reach the parking space of the vehicle 55 in the case of walking by following the walking travel route. The terminal apparatus 10 displays at the display unit 140 the automated driving route, the estimated time required for the automated driving route, the walking travel route, and the estimated time required for the walking travel route; and when a selection of the automated driving route is accepted, the terminal apparatus 10 starts the drive of the autonomous vehicle.

9 Claims, 14 Drawing Sheets

(58) Field of Classification Search
CPC ........... B60W 2540/215; B60W 50/14; B60W 2555/20; B60W 2556/50; B60W 60/0021; G08G 1/005; G08G 1/096816; G08G 1/096838; G08G 1/09685; G08G 1/096866; G08G 1/0969; G08G 1/202; G08G 1/205
See application file for complete search history.

(56) References Cited

U.S. PATENT DOCUMENTS

| | | | |
|---|---|---|---|
| 2013/0231824 A1 | 9/2013 | Wilson et al. | |
| 2014/0232570 A1* | 8/2014 | Skinder | G01C 21/1654 340/989 |
| 2014/0365113 A1* | 12/2014 | McGavran | G01C 21/3423 701/538 |
| 2016/0116293 A1 | 4/2016 | Grover et al. | |
| 2016/0155331 A1 | 6/2016 | Mielenz | |
| 2017/0358208 A1* | 12/2017 | Kazemi | G08G 1/144 |
| 2018/0135990 A1* | 5/2018 | Zhang | G01C 21/3492 |
| 2019/0316920 A1 | 10/2019 | Miyagawa et al. | |
| 2020/0130676 A1* | 4/2020 | Smid | G05D 1/0231 |

FOREIGN PATENT DOCUMENTS

| | | |
|---|---|---|
| JP | 2012167994 A | 9/2012 |
| JP | 2017138924 A | 8/2017 |
| JP | 2018096810 A | 6/2018 |
| JP | 2018163578 A | 10/2018 |
| WO | 2017/176550 A1 | 10/2017 |

OTHER PUBLICATIONS

Bosch Mobility Solutions, "Automated Valet Parking" Youtube, Jul. 26, 2017, p. 1 pp, XP054980282, Retrieved from the Internet.
International Search Report of PCT/JP2019/049838 dated May 15, 2020.
Written Opinion of the International Searching Authority of PCT/JP2019/049838 dated May 15, 2020.

* cited by examiner

US 11,821,736 B2

METHOD FOR SELECTING ROUTE, TERMINAL, SYSTEM FOR SELECTING ROUTE, AND PROGRAM

TECHNICAL FIELD

The present invention relates to a method for selecting a route, a terminal, a system for selecting a route, and a program.

BACKGROUND ART

Heretofore, a system for assisting a vehicle parked in the parking to exit from the parking has become known. For example, with a remote control system of Patent Literature 1, an operator remotely controls a vehicle parked in the parking by operating remote control equipment and causes the vehicle to exit from the parking.

CITATION LIST

Patent Literature

[PTL 1] Japanese Patent Laid-Open No. 2017-138924

SUMMARY OF INVENTION

Technical Problem

When a vehicle has automated driving functionality, it is assumed that the vehicle is in one case controlled with the use of the automated driving functionality to drive and exit from the parking. However, in comparison to the case of causing the vehicle to exit from the parking by using the automated driving functionality, the time for exiting from the parking may be reduced in the case in which a driver moves to the parking space and drives the vehicle to exit from the parking.

The present invention has been made in consideration of the circumstances described above, and an object thereof is to efficiently control a vehicle capable of automated driving to exit from the parking.

Solution to Problem

The entire contents of Japanese Patent Application No. 2018-246694, filed on Dec. 28, 2018 are incorporated in the present specification.

In order to address the problem described above, a method for selecting a route according to an aspect of the present invention includes a first search step of searching an automated driving route of an autonomous vehicle, the automated driving route being from a parking space of the autonomous vehicle to a destination that is set, a first calculation step of calculating a first estimated time to reach the destination in a case in which the autonomous vehicle drives by following the automated driving route, a second search step of searching a walking travel route in a case of traveling by walk from a position of a terminal to the parking space of the autonomous vehicle, a second calculation step of calculating a second estimated time to reach the parking space of the autonomous vehicle in a case of walking by following the walking travel route, a display step of displaying at a display the automated driving route and the first estimated time, and the walking travel route and the second estimated time, an acceptance step of accepting a selection of either the automated driving route or the walking travel route, and an instruction step of instructing the autonomous vehicle to start driving by automated driving when the selection of the automated driving route is accepted.

The method for selecting a route may further include a selection step of selecting as a recommended route either the automated driving route or the walking travel route. In the method for selecting a route, the display step may include differentiating a display appearance of the automated driving route or the walking travel route that is selected in the selection step from a display appearance of the walking travel route or the automated driving route that is not selected in the selection step.

In the method for selecting a route, the selection step may include selecting the walking travel route when a difference between the second estimated time and the first estimated time is greater than a preset time.

In the method for selecting a route, the selection step may include selecting the automated driving route when a walking distance by following the walking travel route is longer than a preset distance.

In the method for selecting a route, the selection step may include selecting the automated driving route when a parking level of the autonomous vehicle is higher than a preset parking level in a case in which a parking location of the autonomous vehicle is a multilevel parking lot.

In the method for selecting a route, the selection step may include selecting either the automated driving route or the walking travel route in accordance with a criterion of environment including at least one of weather and outside-air temperature.

A terminal according to another aspect of the present invention includes an acceptor that accepts a setting of a destination, a position detector that detects a position of the terminal, a receiver that receives information about a parking space of an autonomous vehicle, a first calculator that calculates an automated driving route of the autonomous vehicle, the automated driving route being from the parking space to the destination, and that calculates a first estimated time in which the autonomous vehicle reaches the destination in a case in which the autonomous vehicle drives by following the automated driving route, a second calculator that calculates a walking travel route in a case of traveling by walk from a position of the terminal to the parking space and that calculates a second estimated time to reach the parking space in a case of walking by following the walking travel route, a display that displays the automated driving route and the first estimated time, and the walking travel route and the second estimated time, and a transmitter that transmits instruction information for instructing the autonomous vehicle to start driving by automated driving when the acceptor accepts a selection of the automated driving route.

A system for selecting a route according to a further aspect of the present invention includes an on-board apparatus including a first calculator that calculates an automated driving route of an autonomous vehicle, the automated driving route being from a parking space of the autonomous vehicle to a position, of a destination, indicated by inputted position information, and that calculates a first estimated time to reach the destination in a case in which the autonomous vehicle drives by automated driving by following the automated driving route, a server apparatus including a second calculator that calculates a walking travel route in a case of traveling by walk from a position, of a terminal, indicated by inputted position information to the parking space, of the autonomous vehicle, indicated by inputted information and that calculates a second estimated time to reach the parking space of the autonomous vehicle in a case of walking by following the walking travel route, and the terminal including a display that displays the automated driving route and the first estimated time, and the walking travel route and the second estimated time, an acceptor that accepts a selection of either the automated driving route or the walking travel route, and a transmitter that transmits instruction information for instructing the autonomous vehicle to start driving by automated driving when the acceptor accepts a selection of the automated driving route.

A program according to a still further aspect of the present invention causes a computer to execute a process including a first search procedure of searching an automated driving route of an autonomous vehicle, the automated driving route being from a parking space of the autonomous vehicle to a destination that is set, a first calculation procedure of calculating a first estimated time to reach the destination in a case in which the autonomous vehicle drives by automated driving by following the automated driving route, a second search procedure of searching a walking travel route in a case of traveling by walk from a position of a terminal to the parking space of the autonomous vehicle, a second calculation procedure of calculating a second estimated time to reach the parking space of the autonomous vehicle in a case of walking by following the walking travel route, a display procedure of displaying the automated driving route and the first estimated time, and the walking travel route and the second estimated time, an acceptance procedure of accepting a selection of either the automated driving route or the walking travel route, and an instruction procedure of instructing the autonomous vehicle to start driving by automated driving when the selection of the automated driving route is accepted.

Advantageous Effect of Invention

In one aspect of the present invention, it is possible to efficiently control a vehicle capable of automated driving to exit from the parking.

DESCRIPTION OF EMBODIMENTS

First Embodiment

Figure 1:
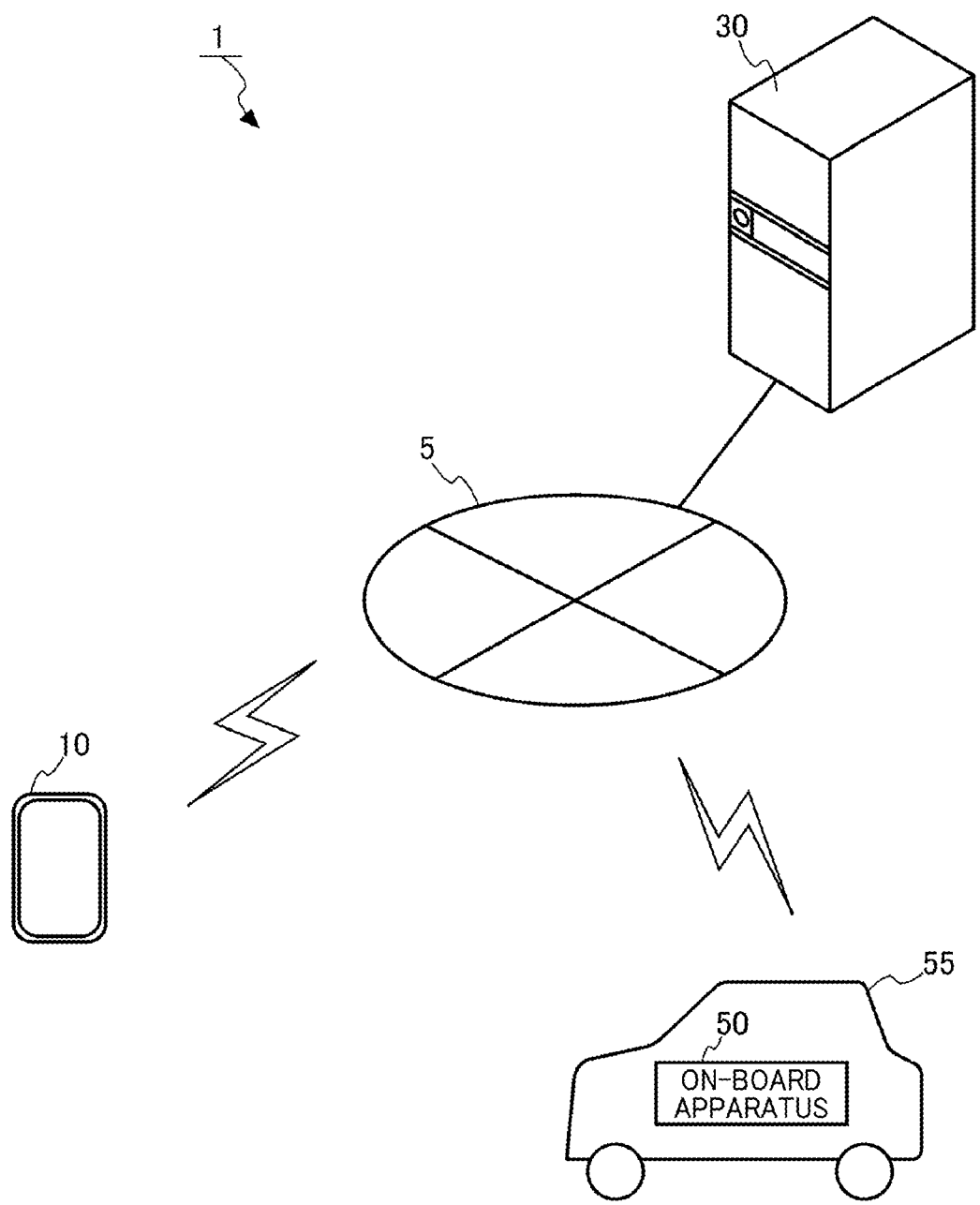
FIG. 1 is a diagram of a system configuration of a route selection system.

FIG. 1 is a diagram of a system configuration of a route selection system 1 to which the present invention is applied.

The route selection system 1 involves a terminal apparatus (terminal) 10, a server apparatus 30, and an on-board apparatus 50 and is configured such that the terminal apparatus 10, the server apparatus 30, and the on-board apparatus 50 are able to perform data communication with each other via a communication network 5. The communication network 5 is constituted by, for example, the Internet, a LAN (Local Area Network), dedicated communication lines especially for WAN (Wide Area Network), a mobile communication network including a base station or the like, and gateways.

The terminal apparatus 10 is a terminal of a user who owns a vehicle 55 equipped with the on-board apparatus 50 and is, for example, a smartphone, a PDA (Personal Digital Assistant), a tablet terminal, or a laptop computer. The terminal apparatus 10 functions as a navigation apparatus in cooperation with the server apparatus 30 and the on-board apparatus 50. For example, the terminal apparatus 10 transmits to the server apparatus 30 information about a present location of the terminal apparatus 10 and a destination that is set, so that the server apparatus 30 is caused to search for a travel route from the present location of the terminal apparatus 10 to the destination. Furthermore, the server apparatus 30 transmits the information about the destination to the on-board apparatus 50 associated with the terminal apparatus 10, so that the on-board apparatus 50 is caused to search for a travel route from a present location of the vehicle 55 to the destination. The terminal apparatus 10 obtains information about the travel route discovered by the server apparatus 30 and information about the travel route discovered by the on-board apparatus 50 and displays the obtained information about the routes of travel.

As the destination, for example, a location at which the user desires to enter the vehicle 55 can be set. For example, in the case of the parking at a large supermarket, a designated pickup and drop-off point can be set as a location to enter the vehicle. Alternatively, the present location of the user may be set as the destination.

User information of the user who utilizes the route selection system 1 is registered in the server apparatus 30. The user information is, for example, an ID and a password. In addition, an on-board apparatus ID that is identification information of the on-board apparatus 50 owned by the user is associated with the user information of the user and registered in the server apparatus 30.

Moreover, when information about a destination is received from the terminal apparatus 10, the server apparatus 30 obtains position information from the on-board apparatus 50 associated with the user information of the user who owns the terminal apparatus 10. The position information of the on-board apparatus 50 denotes a parking space at which the vehicle 55 is parked.

Further, the server apparatus 30 transmits to the on-board apparatus 50 the information about the destination received from the terminal apparatus 10 and causes the on-board apparatus 50 to search for a driving route when the vehicle 55 is driven with automated driving from the parking space of the vehicle 55 to destination.

Furthermore, the server apparatus 30 searches for a route in the case in which the user walks from the set location to the parking space of the vehicle 55 in accordance with the information about the destination received from the terminal apparatus 10 and the position information obtained from the on-board apparatus 50. This travel route is referred to as a walking route. The walking route corresponds to a "walking travel route" of the present invention. The server apparatus 30 transmits the walking route discovered by the server apparatus 30 and the driving route discovered by the on-board apparatus 50 to the terminal apparatus 10. Hereinafter, when the walking route and the driving route are collectively referred to, the walking route and the driving route are both referred to as a "travel route".

The on-board apparatus 50 controls drive of the vehicle 55 by automatic driving control. The vehicle 55 corresponds to an autonomous vehicle of the present invention. The automatic driving control is to control the vehicle 55 to automatically drive to a destination set by a user. The on-board apparatus 50 can perform driver-assistance control to control drive of the vehicle 55 while the vehicle 55 is controlled mainly by a driver to drive. In addition, when information about a destination is received from the server apparatus 30, the on-board apparatus 50 searches for a driving route from the present location of the vehicle 55 to the destination. The on-board apparatus 50 transmits the discovered driving route to the server apparatus 30.

Figure 2:
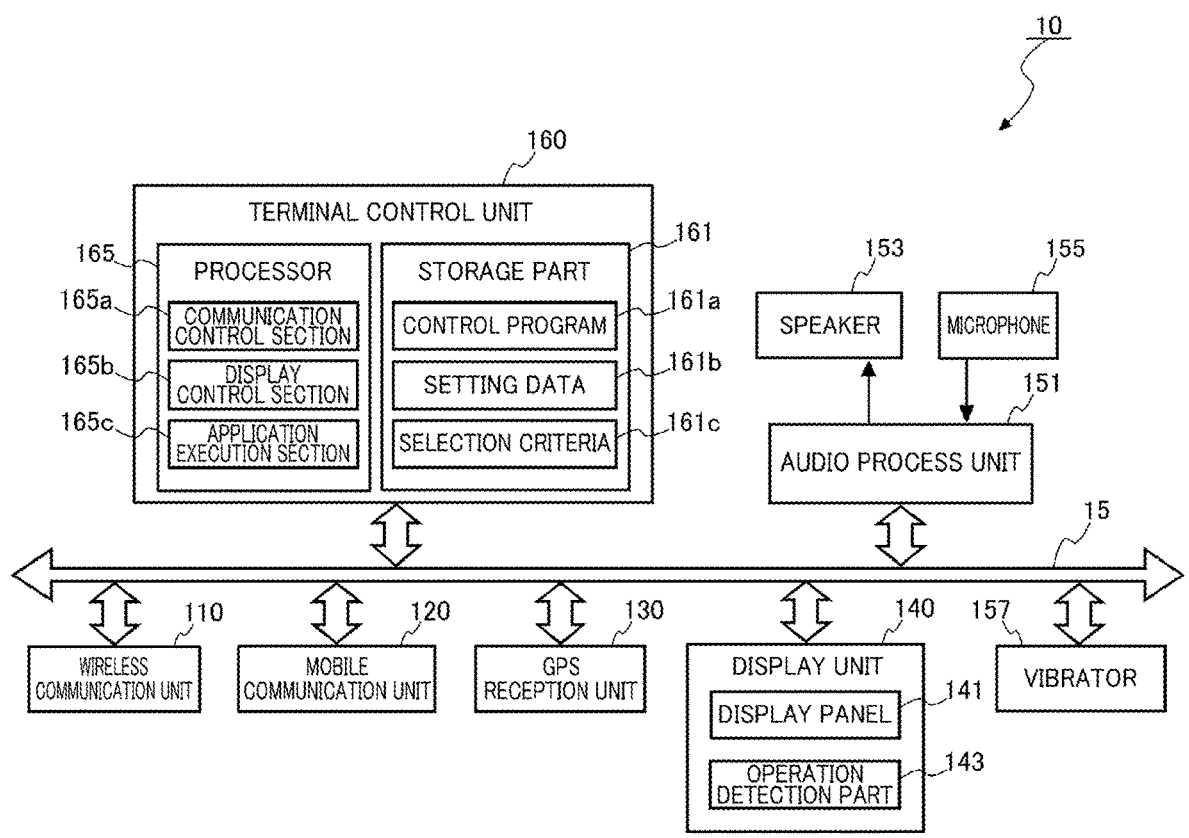
FIG. 2 is a block diagram illustrating a configuration of a terminal apparatus of a first embodiment.

FIG. 2 is a block diagram illustrating a configuration of the terminal apparatus 10.

The configuration of the terminal apparatus 10 is described with reference to FIG. 2.

The terminal apparatus 10 includes a wireless communication unit 110, a mobile communication unit 120, a GPS (Global Positioning System) reception unit 130, a display unit 140, an audio process unit 151, a vibrator 157, a terminal control unit 160 and these components are connected to a bus 15.

The wireless communication unit 110 is a transmitter/receiver that performs, in compliance with a wireless LAN standard (for example, the IEEE802.11a/b/g/n standard), wireless LAN communication with wireless LAN access points and external devices capable of wireless LAN communication. The wireless communication unit 110 corresponds to an example of a "receiver" and a "transmitter" of the present invention.

The mobile communication unit 120 is a transmitter/receiver that includes, for example, an antenna and a wireless communication circuit (both not illustrated) and performs mobile communication through a mobile communication network. The mobile communication network is a communication network included in the communication network 5. The communication system of the mobile communication unit 120 may be 3G (the third generation mobile communication system), LTE (Long Term Evolution), or 4G (the fourth generation mobile communication system). LTE is a registered trademark. The mobile communication unit 120 corresponds to an example of the "receiver" and the "transmitter" of the present invention.

The GPS reception unit 130 is a GPS receiver that receives radio wave signals in a given frequency band transmitted from GPS satellites, demodulates the received radio wave signals, and accordingly obtains information of latitude and longitude. The GPS reception unit 130 outputs to the terminal control unit 160 the obtained information of latitude and longitude as position information. The GPS reception unit 130 corresponds to an example of a "position detector" of the present invention.

The display unit 140 includes a display panel 141 and an operation detection part 143.

The display panel 141 is constituted by a liquid crystal panel or an organic EL display. The display unit 140 displays images at the display panel 141 under the control of the terminal control unit 160.

The operation detection part 143 includes a touch sensor (not illustrated). The operation detection part 143 detects the position that a finger of the user or a touch pen touches on the display panel 141 and outputs to the terminal control unit 160 coordinate information indicating the detected touch position. The coordinate information is information indicating a position in a coordinate system that is set on the display surface of the display panel 141. In the following description, an operation in which a finger of the user or the touch pen touches the display panel 141 is referred to as a touch input. The operation detection part 143 corresponds to an example of an "acceptor" of the present invention.

The audio process unit 151 is connected to a speaker 153 and a microphone 155 and modulates and demodulates audio signals. The audio process unit 151 modulates audio signals that are input from the microphone 155 and outputs the audio signals after modulation to the terminal control unit 160. In addition, the audio process unit 151 demodulates audio signals and outputs the audio signals after demodulation to the speaker 153. The audio process unit 151 is implemented as, for example, a processor for audio processing.

The vibrator 157 vibrates when an actuating signal is input from the terminal control unit 160 and consequently vibrates the housing of the terminal apparatus 10. The vibrator 157 can use a configuration usually known as a vibrator, such as an eccentric motor, a linear actuator, and a piezoelectric element.

The terminal control unit 160 is a computer device including a storage part 161 and a processor 165.

The storage part 161 is a non-volatile storage device, such as a flash memory or an EEPROM (Electronically Erasable and Programmable Read Only Memory). The storage part 161 may also be constituted by a SD memory card or a USB flash drive. The storage part 161 stores a control program 161a such as an OS (Operating System) and application programs. The storage part 161 also stores setting data 161b and selection criteria 161c. The setting data 161b includes, for example, a URL for accessing the server apparatus 30.

The selection criteria 161c is a criterion for selecting either a walking route or a driving route. When a walking route and a driving route are received from the server apparatus 30, the terminal control unit 160 selects either the walking route or the driving route in accordance with the selection criteria and then displays the selected route as a recommended route at the display panel 141. Alternatively, the terminal control unit 160 may display at the display panel 141 both the walking route and the driving route that are received from the server apparatus 30 and display either the walking route or the driving route as a recommended route. The selection criteria 161c include, for example, a criterion of time difference, a criterion of distance, a criterion of environment, a criterion of parking level, and a criterion of time period. Details of these criteria will be described later.

The processor 165 is an operation processing device constituted by a CPU (Central Processing Unit) or a microcomputer. The processor 165 controls individual units of the terminal apparatus 10 by running the control program 161a stored in the storage part 161. The processor 165 may be configured by a single processor or a plurality of processors. The processor 165 may also be constituted by a SoC (System on Chip) in which part or all of the storage part 161 and another circuit are integrated together. Furthermore, the processor 165 may be configured by a combination of a CPU that runs programs and a DSP (Digital Signal Processor) that performs a preset arithmetic processing operation. Further, the processor 165 may be configured such that all functions of the processor 165 are implemented by hardware and a programmable device may be used to configure the processor 165 in such a configuration.

The processor 165 performs data operation and control by implementing an instruction set written in the control program 161a, such that the terminal control unit 160 function as a communication control section 165a, a display control section 165b, and an application execution section 165c.

The communication control section 165a establishes connection to the communication network 5 by controlling the wireless communication unit 110 and the mobile communication unit 120 and performs data communication with the server apparatus 30.

The communication control section 165a transmits to the server apparatus 30, for example, position information about the terminal apparatus 10 that is obtained by the GPS reception unit 130, login information for logging in the server apparatus 30, and information about a destination that is set by the user. The communication control section 165a receives from the server apparatus 30, for example, information about a walking route and a driving route and information of an estimated time required to travel by following each route.

The display control section 165b controls the display unit 140 and causes the display panel 141 to display information. The display control section 165b causes the display panel 141 to display, for example, information that is received by the communication control section 165a and information that is input from the application execution section 165c.

The application execution section 165c runs the application programs included in the control program 161a. The application programs are hereinafter referred to as apps. The application execution section 165c of the present embodiment runs an exit parking assistance app that is used when the parked vehicle 55 is caused to exit from the parking. The function of the exit parking assistance app is described below.

When the exit parking assistance app is selected and started, the application execution section 165c performs wireless communication by using the communication control section 165a and accesses the server apparatus 30. The application execution section 165c accepts inputs of an ID and a password from the user, transmits these kinds of accepted user information to the server apparatus 30, and logs in to the server apparatus 30. After logging in to the server apparatus 30, the application execution section 165c transmits to the server apparatus 30 position information obtained by the GPS reception unit 130 and in turn obtains from the server apparatus 30 information about the weather and the outside-air temperature at a location indicated by the position information. The application execution section 165c stores in the storage part 161 the information about the weather and the outside-air temperature that is received from the server apparatus 30 as the criterion of environment.

When receiving from the server apparatus 30 information of an estimated time required to travel by following each of the driving route and the walking route, the application execution section 165c selects either the driving route or the walking route as a recommended route in accordance with the selection criteria 161c. The selection criteria 161c include, as described above, the criterion of time difference, the criterion of distance, the criterion of environment, the criterion of parking level, and the criterion of time period.

The criterion of time difference is a criterion of the difference between the time required for a walking route and the time required for a driving route. As the criterion of time difference, for example, a time, such as 10 or 15 minutes, is set. The application execution section 165c calculates a time difference by subtracting the estimated time required for a walking route from the estimated time required for a driving route and compares the calculated time difference with a set time that is set as the criterion of time difference. When the calculated time difference is greater than the set time, that is, when it takes relatively long to cause the vehicle 55 to travel from the parking space to the destination by using automated driving, the application execution section 165c selects the walking route as a recommended route.

The criterion of environment is a criterion of the weather and outside-air temperature. When for example, the weather is rainy and the walking route received from the server apparatus 30 is a route to travel outside, the application execution section 165c selects the driving route as a recommended route.

As the criterion of outside-air temperature, an upper limit temperature and a lower limit temperature are set. When the outside-air temperature is higher than the upper limit temperature or when the outside-air temperature is lower than the lower limit temperature, the application execution section 165c selects the driving route as a recommended route. When the outside-air temperature is equal to or higher than the lower limit temperature and equal to or lower than the upper limit temperature, the application execution section 165c does not exclude the walking route from a recommended route.

The criterion of distance is a criterion of a distance with which travel by walk is allowed. The application execution section 165c compares the travel distance of a walking route and a set distance that is set as the criterion of distance. When the travel distance of a walking route is longer than the set distance, the application execution section 165c selects the driving route as a recommended route. when the travel distance of a walking route is equal to or shorter than the set distance, the application execution section 165c does not exclude the walking route from a recommended route.

The criterion of parking level is a criterion as which a parking level is set to allow travel by walk when the parking is a multilevel parking lot. When the parking is a multilevel parking lot, the application execution section 165c compares the parking level of the vehicle 55 and a parking level that is set as the criterion of parking level or the entrance level of a retail establishment or the like. When the parking level at which the vehicle 55 is parked is higher than a parking level as a criterion of parking space or when the number of travel levels from the entrance level of a retail establishment or the like to the parking level of the vehicle 55 is greater than the number of levels that is set as the criterion of parking level, the application execution section 165c selects the driving route as a recommended route. when the parking level at which the vehicle 55 is parked is the parking level of the criterion of parking space or lower, the application execution section 165c does not exclude the walking route from a recommended route. Similarly, when the number of travel levels from the entrance level of a retail establishment or the like to the parking level of the vehicle 55 is equal to or less than the number of levels that is set as the criterion of parking level, the application execution section 165*c* does not exclude the walking route from a recommended route.

The criterion of time period is a criterion of a time period for exiting from the parking. For example, when the vehicle 55 is parked in a large shopping mall, congestion is predicted for a certain time period. The time period for which congestion is predicted is obtained from, for example, the web site of a shopping mall if possible. For example, when the time to exit from the parking is in the time period for which congestion is predicted, the application execution section 165*c* selects the walking route as a recommended route. The application execution section 165*c* may report a recommended time period to exit from the parking in which congestion would be avoided. When the time to exit from the parking is not in the time period for which congestion is predicted, the application execution section 165*c* does not exclude the driving route from a recommended route.

The application execution section 165*c* does not necessarily select a travel route in accordance with all the five criteria of the criterion of time difference, the criterion of distance, the criterion of environment, the criterion of parking level, and the criterion of time period but may select a travel route in accordance with one or any number less than five of the criteria. For example, when it is impossible to obtain information of the time period for which congestion is predicted, the criterion of time period may be excluded.

Figure 3:
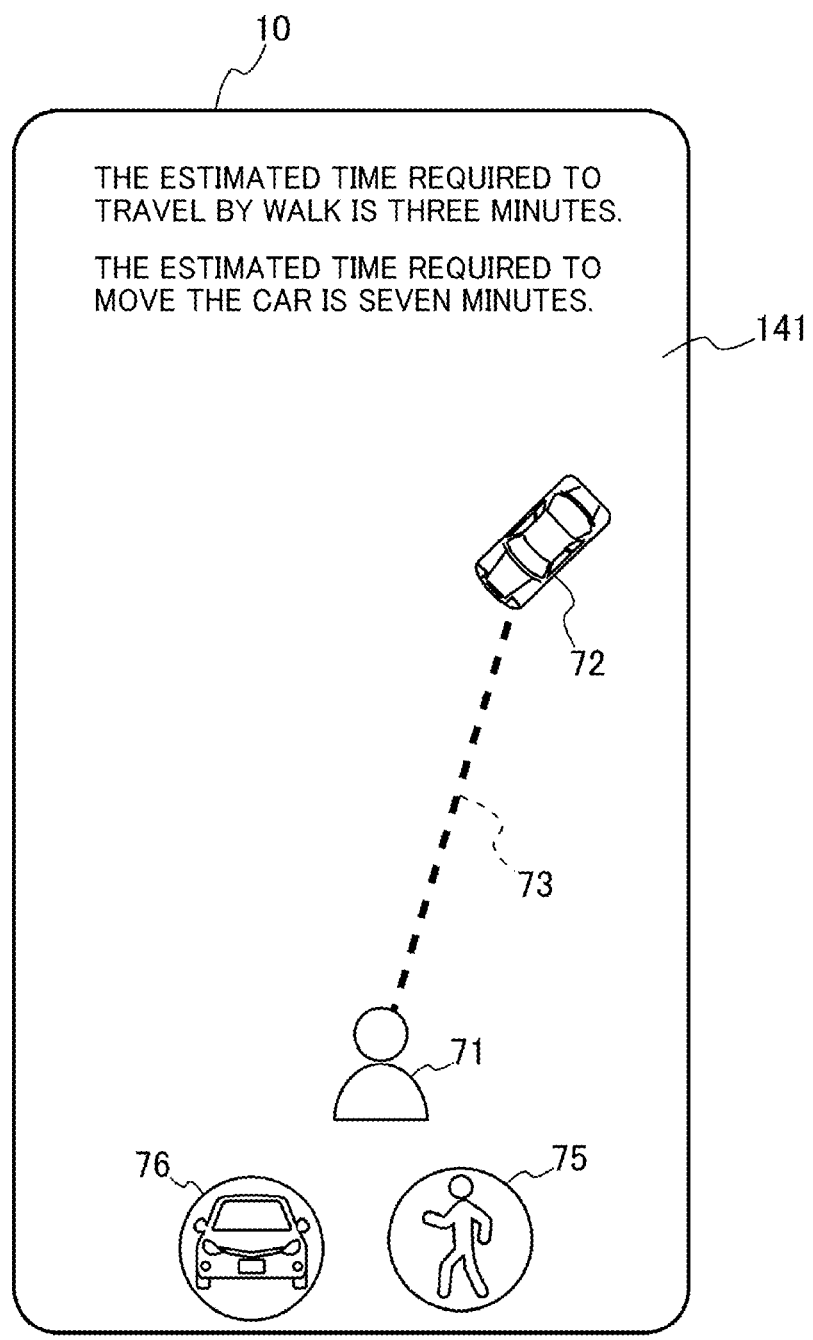
FIG. 3 is a diagram illustrating a display example displayed at a display panel of the terminal apparatus.

FIG. 3 is a diagram illustrating a display example displayed at the display panel 141 of the terminal apparatus 10.

In the display example, an icon 71 representing the present location of the user or the destination that is set by the user, an icon 72 representing the vehicle 55, and a recommended route that is selected by the application execution section 165*c* are indicated at the display panel 141. FIG. 3 illustrates an example in which a walking route 73 is selected by the application execution section 165*c* and the selected walking route 73 is displayed as a recommended route. In addition, an estimated time required at the time of traveling by walk following the walking route 73 may be displayed at the display panel 141 and an estimated time required at the time of causing the vehicle 55 to drive following a driving route by automated driving may also be displayed at the display panel 141.

Furthermore, an icon 75 for selecting the walking route 73 and an icon 76 for selecting a driving route are displayed at the display panel 141. The user is able to select, by selecting the icon 75, the walking route 73 that is displayed at the display panel 141 and that is a recommended route. The user is able to select, by selecting the icon 76, a driving route that is not selected at the display panel 141.

Figure 4:
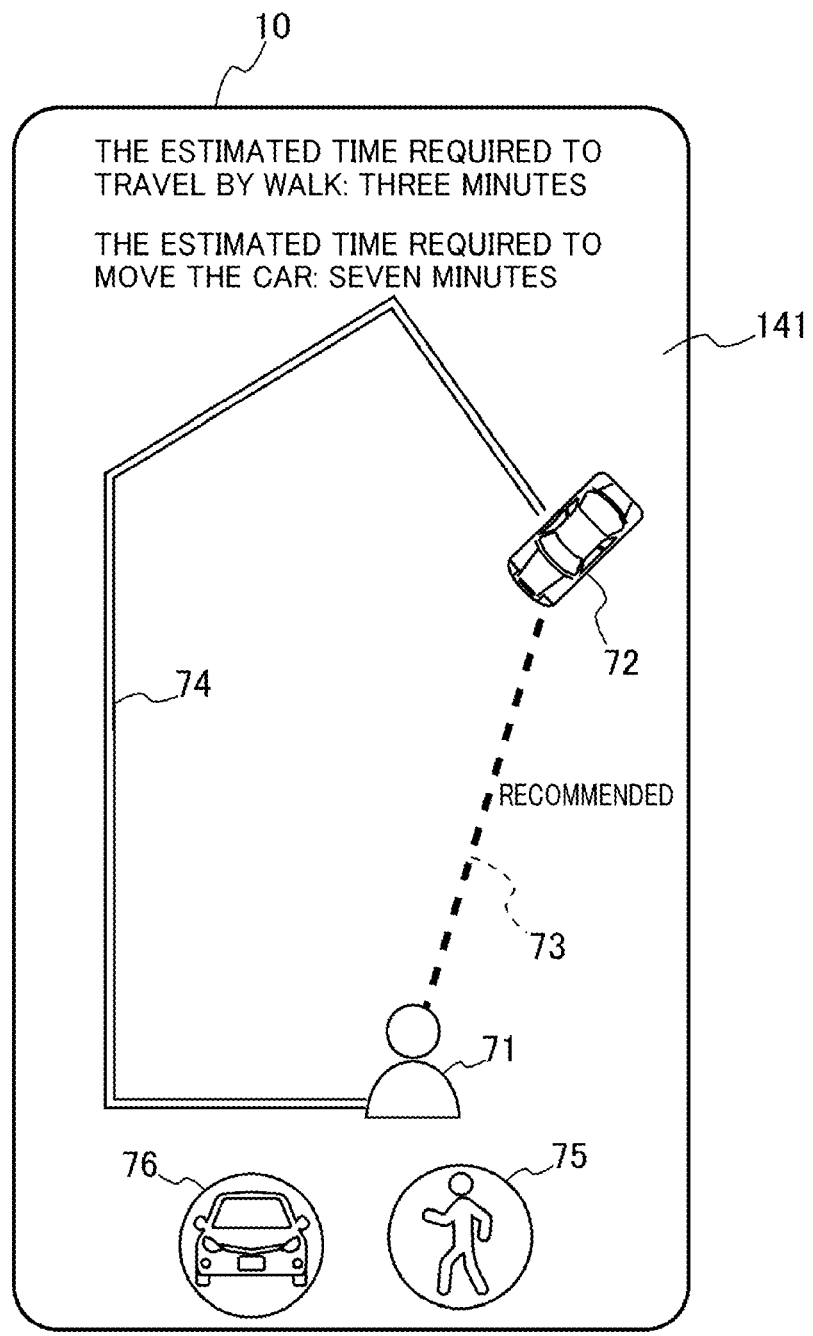
FIG. 4 is a diagram illustrating another display example displayed at the display panel of the terminal apparatus.

FIG. 4 is a diagram illustrating another display example displayed at the display panel 141 of the terminal apparatus 10.

FIG. 4 illustrates a display example in which both travel routes of the walking route 73 and a driving route 74 are displayed at the display panel 141. The terminal apparatus 10 displays a recommended route in a manner different from that of another travel route that is not selected. For example, for the walking route 73, a word "recommended", which indicates the walking route 73 is a recommended route, is displayed. Additionally, when a recommended route is the walking route 73, the display luminance for the walking route 73 may be set at a level higher than the display luminance for the driving route 74 or the walking route 73 may be displayed by using a solid line while the driving route 74 is displayed by using a dashed line. When a recommended route is the walking route 73, the walking route 73 may blink in the display or the display color of the walking route 73 may be different from the display color of the driving route 74. Also in the case in which the driving route 74 is selected as a recommended route, the driving route 74 is displayed in a manner different from that of the walking route 73 that is not selected.

Figure 5:
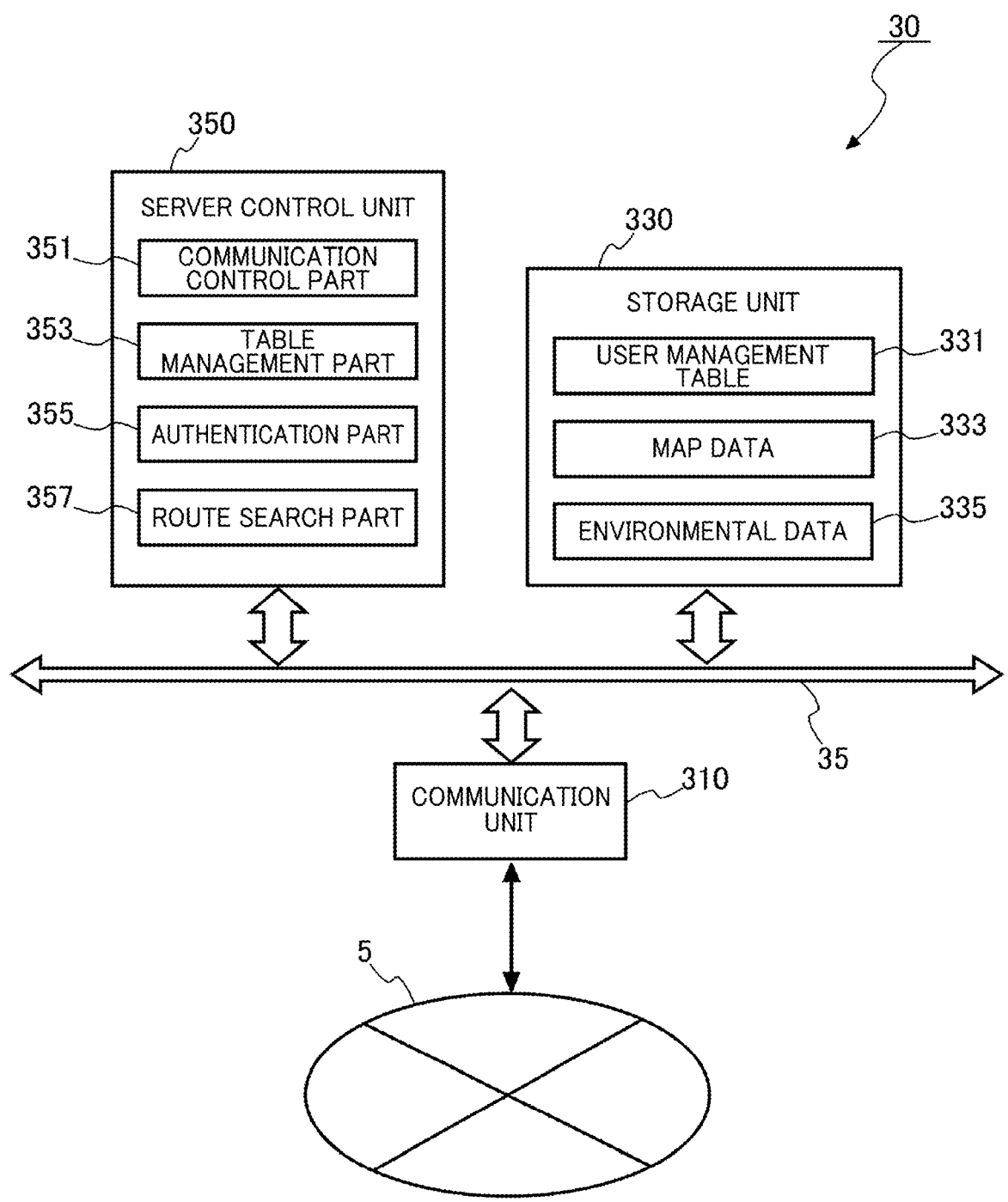
FIG. 5 is a block diagram illustrating a configuration of a server apparatus.

FIG. 5 is a block diagram illustrating a configuration of the server apparatus 30.

The configuration of the server apparatus 30 is described with reference to FIG. 5.

The server apparatus 30 is a computer device including a communication unit 310, a storage unit 330, and a server control unit 350.

The communication unit 310 is a transmitter/receiver that is connected to the communication network 5 via, for example, a network such as a LAN and performs data communication with other devices connected to the communication network 5. The communication unit 310 functions as an "acquisition unit" of the present invention.

The storage unit 330 is constituted by, for example, a hard disk drive (HDD) and stores a user management table 331, map data 333, and environmental data 335.

Figure 6:
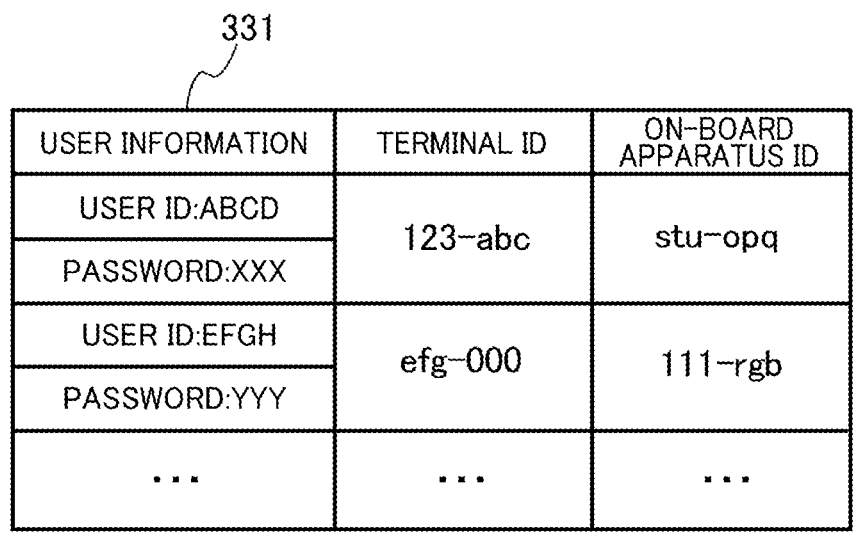
FIG. 6 is a diagram illustrating a user management table.

FIG. 6 is a diagram illustrating the user management table 331.

In the user management table 331, a user ID and a password that are the user information, a terminal ID for identifying the terminal apparatus 10 owned by the user, and an on-board apparatus ID for identifying the on-board apparatus 50 owned by the user are associated with each other and registered.

The environmental data 335 is information about the weather, the outside-air temperature, and the like of different locations collected by the server control unit 350. The map data 333 is data used when the server control unit 350 searches for a walking route. The map data 333 includes facility data. The facility data includes parking data regarding a parking provided in a facility. In addition, the parking data includes type data, approach road data, and parking map data. The type data is data indicating whether a corresponding data is a surface parking lot or a multilevel parking lot. The approach road data is indicated by using particular link data regarding links and node data regarding nodes connecting the links. The particular link data is data that regards roads used to approach respective levels in a multilevel parking lot and that is selected from link data to which road within facility is assigned as the road type.

A processor such as a CPU or a microcomputer, performs data operation and control by implementing an instruction set written in a control program, such that the server control unit 350 functions as a communication control part 351, a table management part 353, an authentication part 355, and a route search part 357. The processor may be configured by a single processor or a plurality of processors. The processor may also be constituted by a SoC in which part or all of the storage unit 330 and another circuit are integrated together. Furthermore, the processor may be configured by a combination of a CPU that runs programs and a DSP that performs a preset arithmetic processing operation. Further, the processor may be configured such that all functions of the processor are implemented by hardware and a programmable device may be used to configure the processor in such a configuration.

The communication control part 351 establishes connection to the communication network 5 by controlling the communication unit 310 and performs data communication with the terminal apparatus 10 and the on-board apparatus 50.

The table management part 353 registers the user information in the user management table 331 and updates the user information registered in the user management table 331.

When the access by the terminal apparatus 10 is accepted, the authentication part 355 requests the terminal apparatus 10 of the accepted access to transmit login information and verifies the login information received from the terminal apparatus 10 in accordance with the user information registered in the user management table 331. When the login information is identical to the user information, the authentication part 355 permits login of the terminal apparatus 10.

The route search part 357 corresponds to an example of a "second calculator" of the present invention and searches for a walking route. When position information is received from the terminal apparatus 10, the route search part 357 refers to the user management table 331 and obtains an on-board apparatus ID of the on-board apparatus 50 associated with the user information. The route search part 357 requests the on-board apparatus 50 of the obtained on-board apparatus ID to transmit position information. The route search part 357 stores in the storage unit 330 the position information uploaded from the on-board apparatus 50 in association with the on-board apparatus ID.

The route search part 357 reads the position information of the on-board apparatus 50 stored in the storage unit 330. The route search part 357 reads the position information of the on-board apparatus 50 from the storage unit 330, refers to the map data 333, and then searches for a route in accordance with a known program for searching for a route. The route search part 357 searches for a walking route that is a travel route by walk from a location indicated by the position information received from the terminal apparatus 10 to a location indicated by the position information of the on-board apparatus 50. The route search part 357 also calculates an estimated time required to travel by walk following the discovered walking route.

The route search part 357 transmits to the on-board apparatus 50 of the on-board apparatus ID the position information about the terminal apparatus 10 and the position information about the destination that are received from the terminal apparatus 10 and causes the on-board apparatus 50 to search for a driving route. The route search part 357 receives from the on-board apparatus 50 the driving route discovered by the on-board apparatus 50 and the estimated time required for the driving route and then transmits to the terminal apparatus 10 the walking route discovered by the route search part 357, the estimated time required for the walking route, and the driving route and the estimated time required for the driving route that are received from the on-board apparatus 50.

While the vehicle 55 drives by automated driving following the driving route, when a notification that it is impossible to drive by automated driving is received from the on-board apparatus 50, the route search part 357 communicates with the on-board apparatus 50 and obtains the position information about the on-board apparatus 50. For example, when failure occurs in the vehicle 55 or when an obstacle is present in the travel direction of the vehicle 55 and the obstacle blocks the travel of the vehicle 55, the on-board apparatus 50 transmits to the server apparatus 30 a notification that it is impossible to drive by automated driving. After receiving the notification, the route search part 357 obtains the position information from the on-board apparatus 50. In addition, the route search part 357 may also obtain again the position information from the terminal apparatus 10. Accordingly, the route search part 357 searches for a walking route for traveling by walk from the location of the terminal apparatus 10 to the location of the on-board apparatus 50. Subsequently, the route search part 357 transmits to the terminal apparatus 10 a notification that the vehicle 55 cannot reach the destination by automated driving and the discovered walking route.

When the notification that it is impossible to drive by automated driving is received from the on-board apparatus 50, the route search part 357 may cause the on-board apparatus 50 to capture an image by using a camera 550. The on-board apparatus 50 generates imaging data by causes the camera 550 to capture an image in the travel direction of the vehicle 55 on the driving route and transmits the generated imaging data to the server apparatus 30. The server apparatus 30 transmits the received imaging data to the terminal apparatus 10, so that the imaging data is displayed at the display panel 141 of the terminal apparatus 10.

When the position information is received from the on-board apparatus 50, the route search part 357 refers to the type data included in the map data 333 and accordingly determines whether the parking is a surface parking lot or a multilevel parking lot. When the parking in which the vehicle 55 is parked is a multilevel parking lot, the route search part 357 specifies the number of level at which the vehicle 55 is situated by comparing the location received from the on-board apparatus 50 and the approach road data. The route search part 357 may transmit to the terminal apparatus 10 the number of level at which the vehicle 55 is situated in the multilevel parking lot and a parking map of the parking level. Accordingly, the user can recognize the parking position of the vehicle 55 by viewing information displayed in the terminal apparatus 10. As a result, when the vehicle 55 stops in some midpoint, it is easy to move to the parking position.

Figure 7:
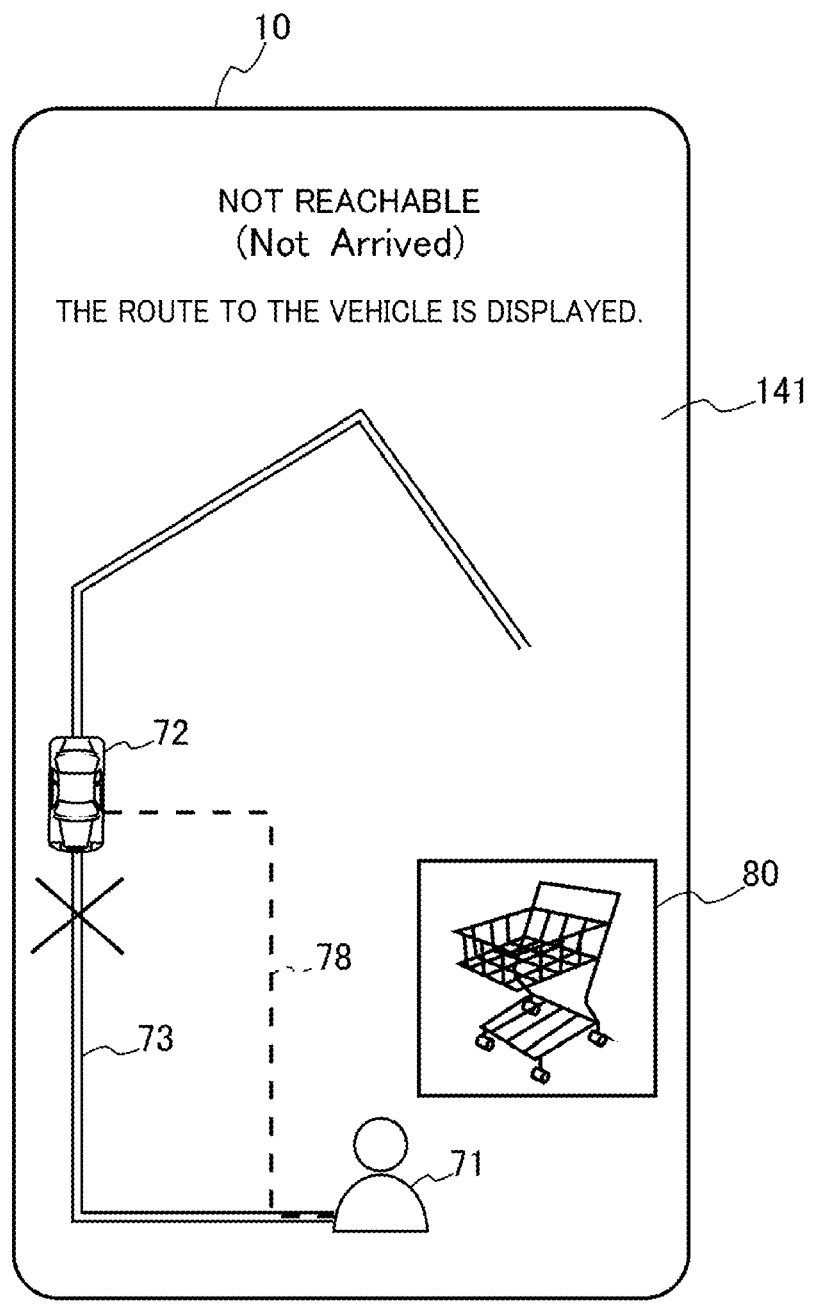
FIG. 7 is a diagram illustrating a display example that is displayed at the display panel of the terminal apparatus.

FIG. 7 is a diagram illustrating a display example that is displayed at the display panel 141 of the terminal apparatus 10.

When the vehicle 55 cannot drive by automated driving, a message that the vehicle 55 cannot reach the set destination and a walking route 78 from the icon 71 indicating the destination to the parking position of the vehicle 55 are displayed at the display panel 141 of the terminal apparatus 10. Additionally, a captured image 80 imaged by the camera 550 of the on-board apparatus 50 is displayed at the display panel 141. By viewing the captured image 80, the user can specify a factor by which the vehicle 55 is not able to drive by automated driving. The captured image 80 illustrated in FIG. 7 indicates the state in which an image of a shopping cart is displayed as an obstacle. The user travels by walk by following the indication of the walking route 78, such that the user travels to the parking position of the vehicle 55. At this time, the remaining route of the driving route 74 may be delated and only the walking route 78 may be displayed. The user enters the vehicle 55; and when it is possible to avoid the obstacle, the vehicle 55 is caused to exit from the parking by user's driving operation.

Figure 8:
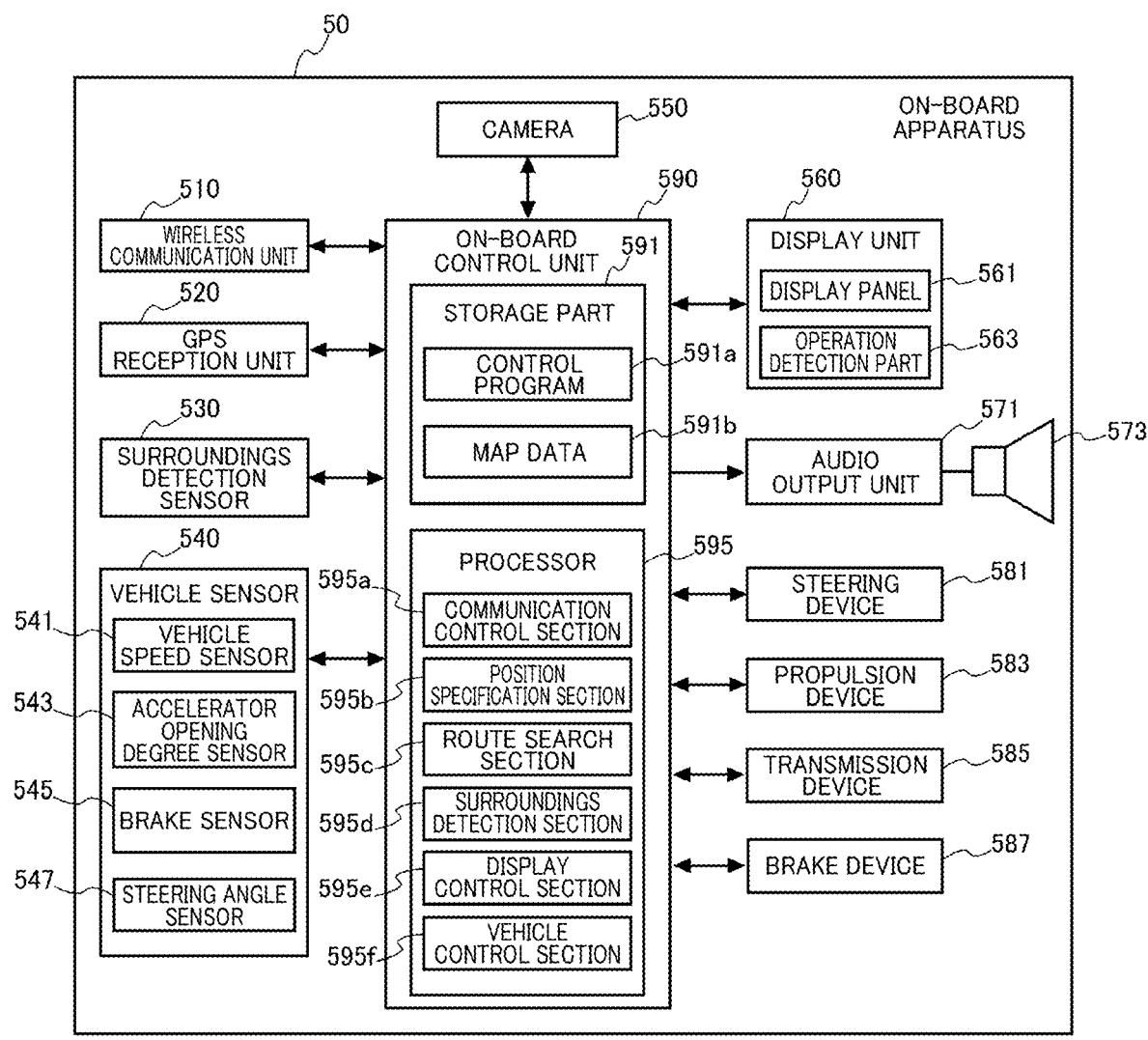
FIG. 8 is a block diagram illustrating a configuration of an on-board apparatus.

FIG. 8 is a block diagram illustrating a configuration of the on-board apparatus 50.

The configuration of the on-board apparatus 50 is described with reference to FIG. 8.

The on-board apparatus 50 includes the wireless communication unit 510, a GPS reception unit 520, a surroundings detection sensor 530, a vehicle sensor 540, the camera 550, a display unit 560, an audio output unit 571, a speaker 573, and an on-board control unit 590. The on-board apparatus 50 also includes, as functional units for controlling drive of the vehicle 55, a steering device 581, a propulsion device 583, a transmission device 585, and a brake device 587.

The wireless communication unit 510 is constituted by, for example, a TCU (Telematics Control Unit) and performs wireless communication with base station apparatuses, which are not illustrated in the drawing, in compliance with a communication standard, such as LTE or 4G.

The GPS reception unit 520 is a GPS receiver that receives radio wave signals in a given frequency band transmitted from GPS satellites, demodulates the received radio wave signals, and accordingly obtains information of latitude and longitude. The GPS reception unit 520 outputs to the on-board control unit 590 the obtained information of latitude and longitude as position information.

The surroundings detection sensor 530 detects an obstacle in the surrounding area around the vehicle 55 by using radio waves (for example, millimeter waves) or light. A sensor installed in the surroundings detection sensor 530 includes, for example, a millimeter wave radar or a light detection and ranging device (LIDAR: Light Detection and Ranging). The surroundings detection sensor 530 transmits radio waves or light to the surrounding area around the vehicle 55 and receives radio waves or light reflected by an obstacle, such that the surroundings detection sensor 530 detects an obstacle. The surroundings detection sensor 530 outputs information about the detected obstacle to the on-board control unit 590. The obstacle includes, for example, a moving obstacle such as a pedestrian, a bicycle, a shopping cart, or another vehicle.

The vehicle sensor 540 includes, as sensors, a vehicle speed sensor 541, an accelerator opening degree sensor 543, a brake sensor 545, and a steering angle sensor 547.

The vehicle speed sensor 541 measures the vehicle speed that is the speed of the vehicle 55 and outputs a sensor signal representing the measured vehicle speed to the on-board control unit 590. The accelerator opening degree sensor 543 measures the degree of depression of an accelerator pedal, which is not illustrated in the drawing, and outputs a sensor signal representing the detected degree of depression to the on-board control unit 590. The brake sensor 545 measures the degree of depression of a brake pedal, which is not illustrated in the drawing, and outputs a sensor signal representing the detected degree of depression to the on-board control unit 590. The steering angle sensor 547 measures the steering angle of a steering wheel, which is not illustrated in the drawing, and outputs a sensor signal representing the detected steering angle to the on-board control unit 590.

The camera 550 includes an image sensor, such as a CCD (Charge Coupled Device) or a CMOS (Complementary Metal-Oxide Semiconductor), and a data processing circuit that generates imaging data based on the photodetection state of the image sensor. The camera 550 generates imaging data by capturing an image in the travel direction of the vehicle 55 on the driving route and outputs the generated imaging data to the on-board control unit 590. The camera 550 may be constituted by a stereo camera. When the camera 550 is constituted by a stereo camera, it is possible to measure the distance to an obstacle imaged in imaging data.

The display unit 560 includes a display panel 561 and an operation detection part 563.

The display panel 561 is constituted by, for example, a liquid crystal panel or an organic EL (Electro Luminescent) display. The display unit 560 displays images at the display panel 561 under the control of the on-board control unit 590.

The operation detection part 563 includes a touch sensor, which is not illustrated in the drawing. The operation detection part 563 detects the position that a finger of the user or a touch pen touches on the display panel 561 and outputs to the on-board control unit 590 coordinate information indicating the detected touch position. The coordinate information is information indicating a position in a coordinate system that is set on the display surface of the display panel 561.

The audio output unit 571 includes, for example, a D/A converter and an amplifier, which are not illustrated in the drawing. The audio output unit 571 converts the form of audio signals that are for route guidance and outputted by the on-board control unit 590 from digital signals to analog signals and amplifies the signals by using the amplifier. The audio signals amplified by the audio output unit 571 is output as audio in the vehicle cabin of the vehicle 55 with the use of the speaker 573.

The steering device 581 is a device that steers a steering wheel of the vehicle 55. The propulsion device 583 is a device that adjusts propulsion force of a propulsion wheel of the vehicle 55. The transmission device 585 is a device that controls gear positions of the vehicle 55. The brake device 587 is a device that controls a brake of the vehicle 55. Illustrations of the steering wheel, the propulsion wheel, and the brake are omitted.

The on-board control unit 590 is a computer device including a storage part 591 and a processor 595.

The storage part 591 includes non-volatile storage devices (all not illustrated) such as a hard disk and an EEPROM and stores data in a rewritable manner. The storage part 591 stores a control program 591a and map data 591b. The control program 591a is a program that is run by the processor 595. The map data 591b contains information about nodes representing an intersection and other connection points in a road network, information about links representing road sections between nodes, and information about names of administrative divisions, roads, facilities, intersections, and the like on the map. The storage part 591 stores, in addition to these, the on-board apparatus ID that is identification information of the on-board apparatus 50.

The processor 595 is an operation processing device constituted by a CPU, a microcomputer, or the like. The processor 595 controls individual units of the on-board apparatus 50 by running the control program 591a. The processor 595 may be configured by a single processor or a plurality of processors. The processor 595 may also be constituted by a SoC in which part or all of the storage part 591 and another circuit are integrated together. Furthermore, the processor 595 may be configured by a combination of a CPU that runs programs and a DSP that performs a preset arithmetic processing operation. Further, the processor 595 may be configured such that all functions of the processor 595 are implemented by hardware and a programmable device may be used to configure the processor 595 in such a configuration.

In the on-board control unit 590, the processor 595 performs data operation and control by implementing an instruction set written in the control program 591a. This causes the on-board control unit 590 to function as a communication control section 595a, a position specification section 595b, a route search section 595c, a surroundings detection section 595d, a display control section 595e, and a vehicle control section 595f.

The communication control section 595a establishes connection to the communication network 5 by controlling the wireless communication unit 510 and performs data communication with the server apparatus 30.

The position specification section 595b specifies the position of the vehicle 55. The position specification section 595b specifies the position of the vehicle 55 in accordance with information of latitude and longitude inputted from the GPS reception unit 520 and information of vehicle speed and the like inputted from the vehicle speed sensor 541.

When the route search section 595c receives from the server apparatus 30 the position information about a destination, the route search section 595c refers to the map data 591b and, in accordance with a known program for searching for a route, the route search section 595c searches for a driving route in the case of causing the vehicle 55 to drive by automated driving from the present location to the destination. In addition, the route search section 595c calculates an estimated time required to reach the destination in the case of causing the vehicle 55 to drive along the discovered driving route. The route search section 595c corresponds to an example of a "first calculator" of the present invention. The estimated time required corresponds to a "first estimated time" of the present invention.

The surroundings detection section 595d detects an obstacle in accordance with the imaging data generated by the camera 550 and a detection result of the surroundings detection sensor 530. When the surroundings detection section 595d detects an obstacle, the surroundings detection section 595d notifies the vehicle control section 595f of the detected obstacle, a direction in which the obstacle is situated, and a distance to the obstacle.

The display control section 595e controls the display unit 560 and causes the display panel 561 to display an image. For example, the display control section 595e causes the display panel 561 to display the map data 591b that is read from the storage part 591 and a driving route that is discovered by the route search section 595c in a manner in which the driving route is superimposed on the map data 591b.

Imaging data and information of the vehicle speed, the degree of accelerator opening, the degree of depression of the brake pedal, the steering angle, the position information about the vehicle 55, and the like are inputted to the vehicle control section 595f. In accordance with these kinds of inputted information, the vehicle control section 595f controls steering, propulsion, braking, and gearshifting of the vehicle 55, so that the vehicle 55 is caused to automatically drive.

For example, the vehicle control section 595f sets a target value of vehicle speed, a target value of acceleration, and a target value of steering angle that are for causing the vehicle 55 to drive along the driving route discovered by the route search section 595c. The vehicle control section 595f controls the steering device 581, the propulsion device 583, the transmission device 585, and the brake device 587 to reach the set target values. At this time, the vehicle control section 595f performs feedback control such that the detection results of the vehicle speed sensor 541, the accelerator opening degree sensor 543, the brake sensor 545, and the steering angle sensor 547 are inputted and the vehicle control section 595f feedback-controls steering, acceleration, and braking of the vehicle 55 to achieve values close to the target values. Additionally, the vehicle control section 595f controls the vehicle 55 to avoid a collision with an obstacle in accordance with the detection result of the surroundings detection section 595d.

Figure 9:
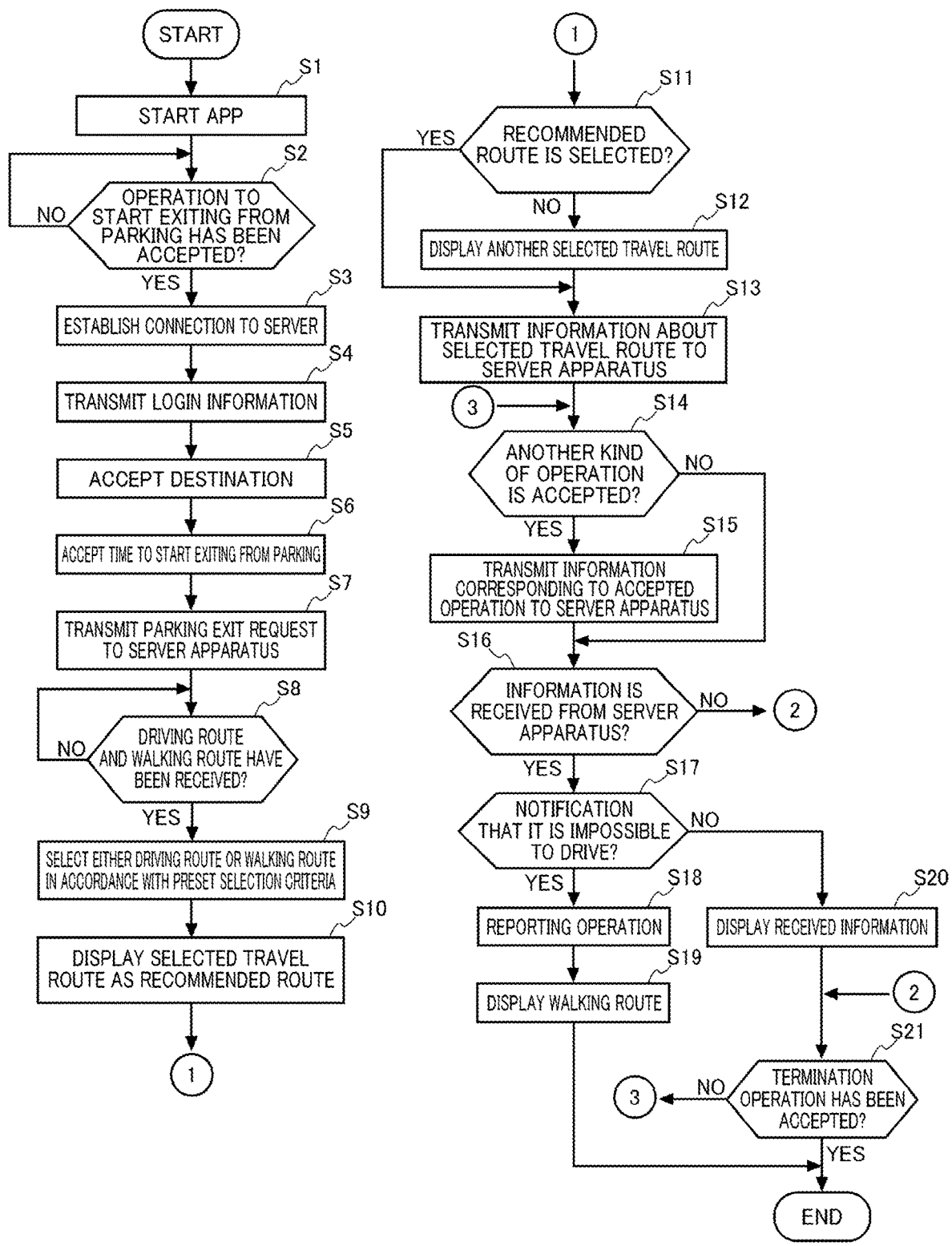
FIG. 9 is a flowchart illustrating an operation of the terminal apparatus.

FIG. 9 is a flowchart illustrating an operation of the terminal apparatus 10.

The operation of the terminal apparatus 10 is described with reference to the flowchart illustrated in FIG. 9.

Upon selection of an app by a touch input, in the terminal control unit 160, the processor 165 runs the selected app. This starts the selected app (step S1). Here, it is assumed that the exit parking assistance app, which causes the vehicle 55 to exit from the parking, is selected.

Next, the terminal control unit 160 determines whether an operation to start exiting from the parking has been accepted (step S2). When no operation to start exiting from the parking has been accepted (NO in step S2), the terminal control unit 160 waits until an operation to start exiting from the parking is accepted. While in this flow the case in which the terminal apparatus 10, the server apparatus 30, and the on-board apparatus 50 start operating by accepting an operation to exit from the parking is described, a start time to start exiting from the parking may be registered and the terminal apparatus 10, the server apparatus 30, and the on-board apparatus 50 may start operating when the registered start time is reached.

When an operation to exit from the parking has been accepted (YES in step S2), the terminal control unit 160 accesses a URL stored in the storage part 161 and establishes connection to the server apparatus 30 (step S3). A login request is transmitted from the server apparatus 30 to which the terminal apparatus 10 established connection. When the login request is received from the server apparatus 30, the terminal control unit 160 transmits login information such as an ID and a password to the server apparatus 30 (step S4).

Next, the terminal control unit 160 accepts an input of a destination (step S5). Firstly, the terminal control unit 160 causes the display panel 141 to display a guidance for asking whether to set the present location of the terminal apparatus 10 as a destination. When an operation to set the present location as a destination is accepted, the terminal control unit 160 sets the present location as a destination.

By contrast, when an operation to not set the present location as a destination is accepted, the terminal control unit 160 displays at the display panel 141 a surrounding map including the present location of the terminal apparatus 10 and accepts a setting of destination. While viewing the map displayed at the display panel 141, the user touches a position that the user desires to set as a destination. The terminal control unit 160 sets a position on the map corresponding to the position at which a touch input is detected.

Next, the terminal control unit 160 accepts an input of a time to start exiting from the parking (step S6). Firstly, the terminal control unit 160 causes the display panel 141 to display a guidance for asking whether to set the present time as a time to start exiting from the parking. When an operation to set the present time as a time to start exiting from the parking is accepted, the terminal control unit 160 sets the present time as a time to start exiting from the parking.

By contrast, when an operation to not set the present time as a time to start exiting from the parking is accepted, the terminal control unit 160 accepts an input of a time to start exiting from the parking. The terminal control unit 160 sets the time accepted in accordance with a touch input as a time to start exiting from the parking. In this flow, the case in which the present time is set as a time to start exiting from the parking is described.

Next, the terminal control unit 160 transmits to the server apparatus 30 the position information indicating the position of the set destination, the position information indicating the position of the terminal apparatus 10, and a parking exit request or an parking exit advance order that contains a start time to exit from the parking (step S7). In this flow, the case in which the present time is set as a time to start exiting from the parking is described.

Next, the terminal control unit 160 determines whether information about a driving route and a walking route has been received from the server apparatus 30 (step S8). The driving route and the walking route transmitted by the server apparatus 30 each includes a time required to travel by following the corresponding route. When information about a driving route and a walking route has not been received (NO in step S8), the terminal control unit 160 waits until information about a driving route and a walking route is received.

When a driving route and a walking route have been received (YES in step S8), the terminal control unit 160 selects either the driving route or the walking route in accordance with the preset selection criteria 161c (step S9). The terminal control unit 160 causes the display panel 141 to display the selected driving or walking route as a recommended route (step S10). Step S9 corresponds to a "selection step" and a "selection procedure" of the present invention. While in this flowchart the case in which the display panel 141 is caused to display the selected driving or walking route as a recommended route is described, the display panel 141 may be caused to display both the driving route and the walking route. At this time, the terminal control unit 160 may select either the driving route or the walking route as a recommended route and the selected recommended route may be displayed in a display appearance different from the display appearance of the other not selected as a recommended route. Step S10 corresponds to a "display step" and a "display procedure" of the present invention.

Next, the terminal control unit 160 determines whether an operation to select the recommended route is accepted (step S11). Step S11 corresponds to an "acceptance step" and an "acceptance procedure" of the present invention. When an operation to select the recommended route is accepted (YES in step S11), the terminal control unit 160 transmits information about the selected recommended route to the server apparatus 30 (step S13). In contrast, when an operation to select the other travel route is accepted (NO in step S11), the terminal control unit 160 causes the display panel 141 to display the other selected travel route (step S12). Subsequently, the terminal control unit 160 transmits information about the selected travel route to the server apparatus 30 (step S13). Here, when the operation accepted in step S11 is an operation to select the driving route, the operation to select the driving route may start automated driving of the vehicle 55.

Next, the terminal control unit 160 determines whether another kind of operation is accepted (step S14). For example, in the case in which the information about a travel route transmitted to the server apparatus 30 in step S13 is information about a driving route, the other kind of operation include processing for causing the camera 550 of the vehicle 55 to perform imaging. The other kind of operation also includes processing for canceling automated driving of the vehicle 55 after the on-board apparatus 50 is ordered to perform automated driving. In addition, in the case in which the information about a travel route transmitted to the server apparatus 30 in step S13 is information about a walking route, the other kind of operation includes, for example, an operation to end route guidance to the destination accepted in step S5.

When the other kind of operation is accepted (YES in step S14), the terminal control unit 160 transmits information corresponding to the accepted operation to the server apparatus 30 (step S15). When the other kind of operation is not accepted (NO in step S14), the terminal control unit 160 determines whether information is received from the server apparatus 30 (step S16).

The information that the terminal apparatus 10 receives from the server apparatus 30 includes, for example, information for reporting that the vehicle 55 cannot drive by automated driving and information about a travel route to the vehicle 55 when the vehicle 55 stops in some midpoint of the driving route and cannot drive. When information is received from the server apparatus 30 (YES in step S16), the terminal control unit 160 determines whether the received information is a notification indicating that it is impossible to drive by automated driving (step S17).

When the received information is a notification indicating that it is impossible to drive by automated driving (YES in step S17), the terminal control unit 160 performs a reporting operation (step S18). For example, the terminal control unit 160 outputs a preset reporting sound via the speaker 153 or actuates the vibrator 157 and consequently vibrates the housing of the terminal apparatus 10. Subsequently, the terminal control unit 160 receives from the server apparatus 30 information indicating a walking route to the parking space of the vehicle 55 and causes the display panel 141 to display the received walking route (step S19).

By contrast, When the received information is not a notification indicating that it is impossible to drive by automated driving (NO in step S17), the terminal control unit 160 causes the display panel 141 to display the received information (step S20). Subsequently, the terminal control unit 160 determines whether a termination operation to terminate the app has been accepted (step S21). Also, when information is not received from the server apparatus 30 in step S16 (NO in step S16), the terminal control unit 160 determines whether a termination operation to terminate the app has been accepted (step S21). When the termination operation to terminate the app has not been accepted (NO in step S21), the terminal control unit 160 returns to the determination in step S14. When the termination operation to terminate the app has been accepted (YES in step S21), the terminal control unit 160 ends this processing flow.

Figure 10:
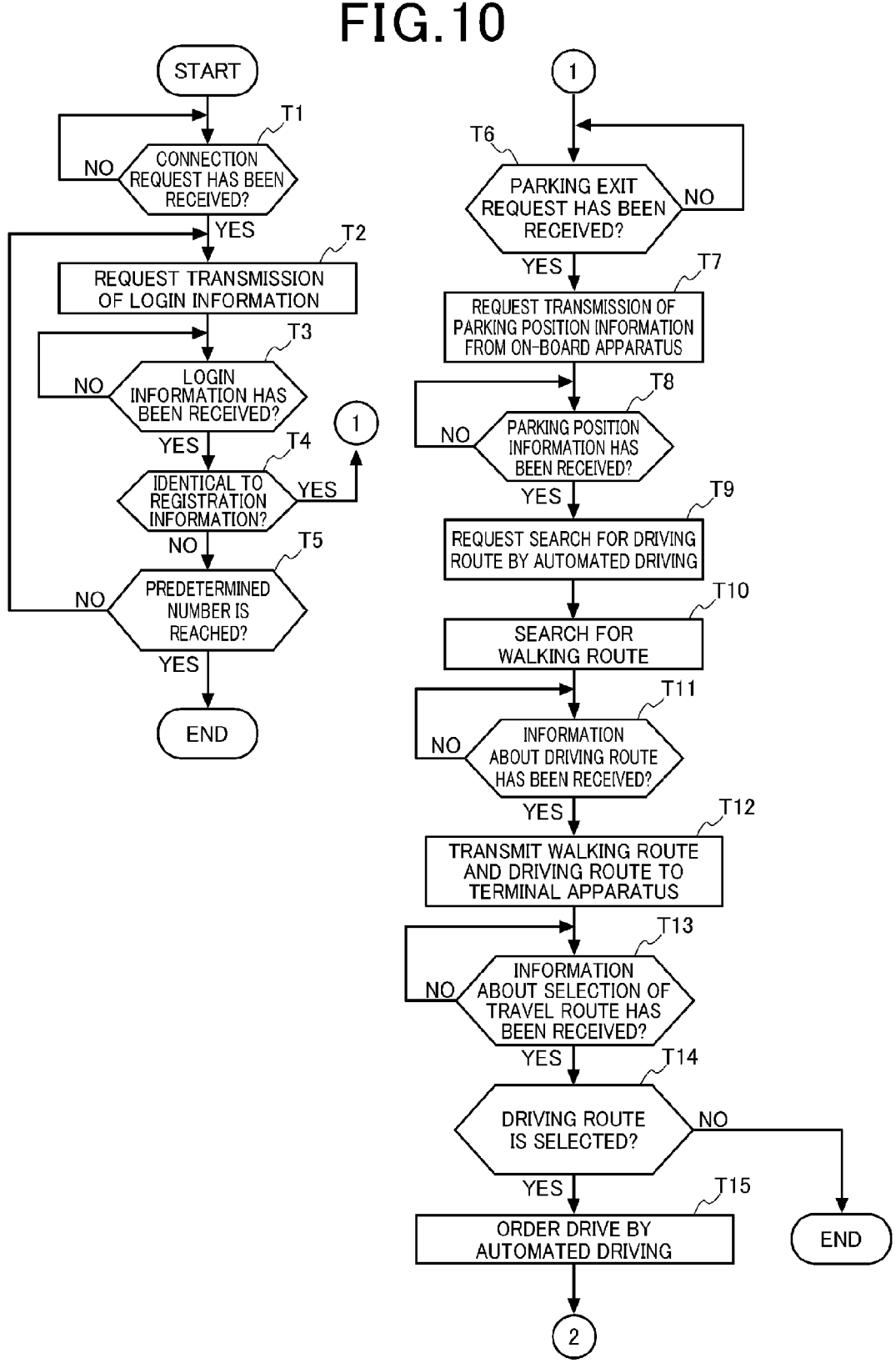
FIG. 10 is a flowchart illustrating an operation of the server apparatus.
Figure 11:
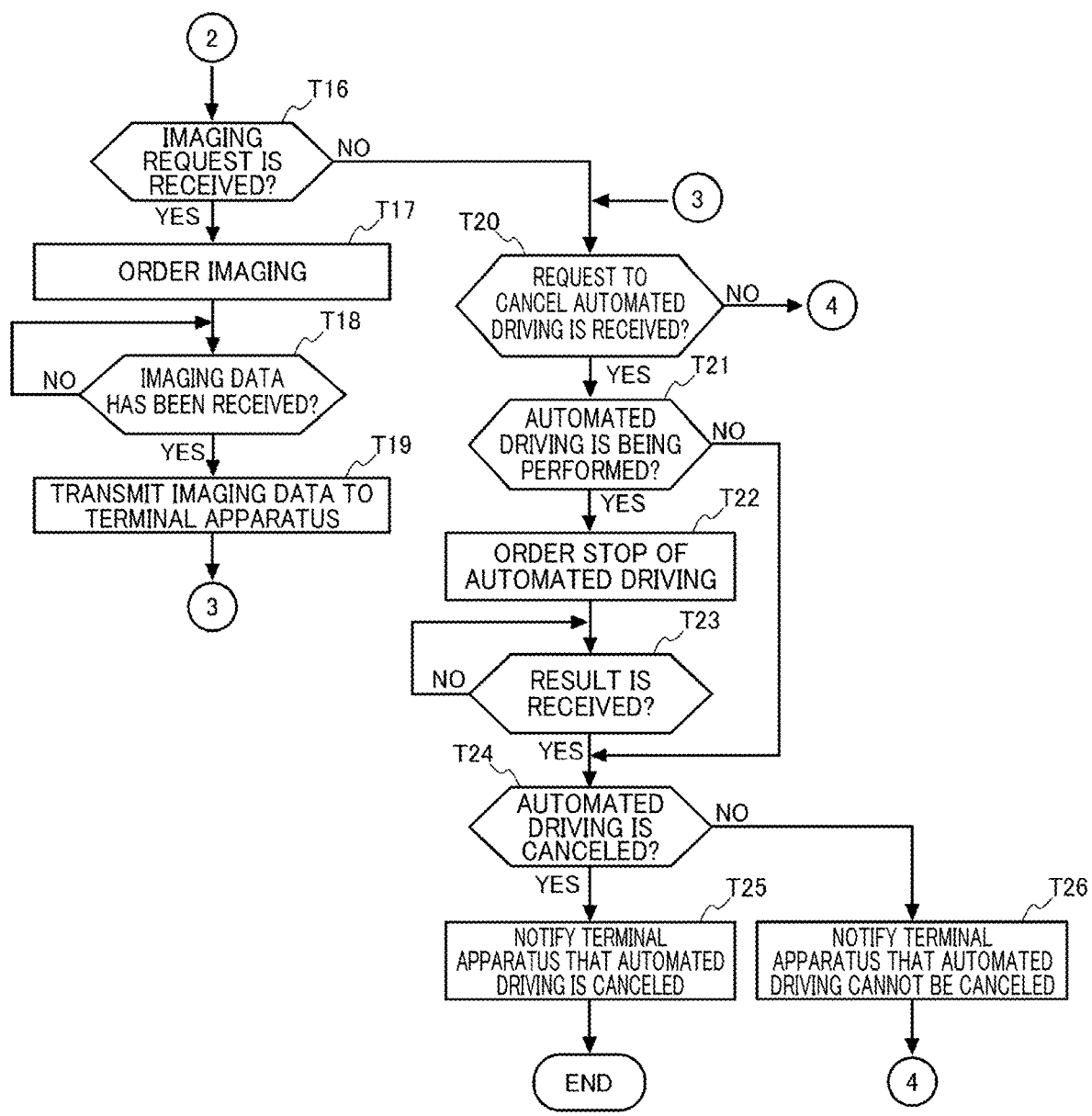
FIG. 11 is a flowchart illustrating an operation of the server apparatus.
Figure 12:
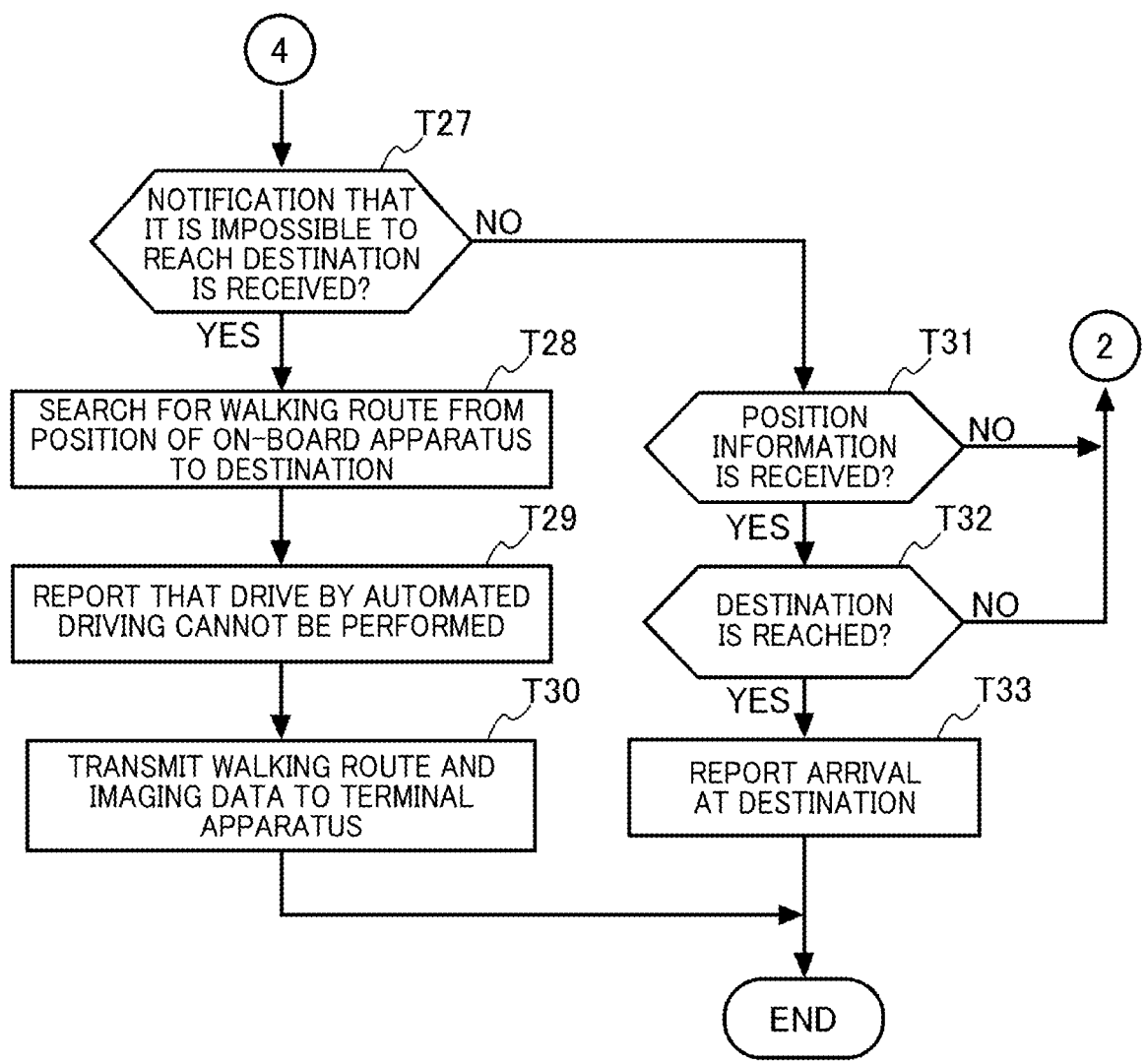
FIG. 12 is a flowchart illustrating an operation of the server apparatus.

FIGS. 10, 11, and 12 are flowcharts illustrating an operation of the server apparatus 30.

The operation of the server apparatus 30 is described with reference to the flowcharts illustrated in FIGS. 10, 11, and 12.

Firstly, the server control unit 350 determines whether a connection request has been received (step T1). When no connection request has been received (NO in step T1), the server control unit 350 waits until a connection request is received. By contrast, when a connection request has been received (YES in step T1), the server control unit 350 requests transmission of login information from the terminal apparatus 10 from which the connection request has been received (step T2).

Next, the server control unit 350 determines whether login information has been received from the terminal apparatus 10 (step T3). When no login information has been received (NO in step T3), the server control unit 350 waits until login information is received. When login information has been received (YES in step T3), the server control unit 350 determines whether the received login information is identical to registration information about a corresponding user (step T4).

When the login information is not identical to any registration information (NO in step T4), the server control unit 350 determines whether the number of times it has been determined that the login information is not identical to any registration information reaches a predetermined number (step T5). When the number of times it has been determined that the login information is not identical to any registration information reaches the predetermined number (YES in step T5), the server control unit 350 ends this processing flow. When the number of times it has been determined that the login information is not identical to any registration information does not reach the predetermined number (NO in step T5), the server control unit 350 returns to step T2 and requests the retransmission of login information.

When the login information is identical to the user registration information (YES in step T4), the server control unit 350 determines whether a parking exit request has been received from the terminal apparatus 10 from which the connection request has been received (step T6). The parking exit request contains position information indicating the position of a set destination, position information indicating the position of the terminal apparatus 10, and a start time to exit from the parking. When no parking exit request has been received (NO in step T6), the server control unit 350 waits to perform a subsequent processing or determination until a parking exit request is received.

When a parking exit request has been received (YES in step T6), the server control unit 350 requests transmission of parking position information from the on-board apparatus 50 associated with the terminal apparatus 10 by the user registration information (step T7). The server control unit 350 then determines whether the parking position information has been received from the on-board apparatus 50 (step T8). When the parking position information has not been received (NO in step T8), the server control unit 350 waits to perform a subsequent processing or determination until the parking position information is received.

When the parking position information has been received (YES in step T8), the server control unit 350 transmits to the on-board apparatus 50 the information about a destination received from the terminal apparatus 10 and requests a search for a driving route by automated driving (step T9). In response to the request received from the server apparatus 30, the on-board apparatus 50 searches for a driving route from the position of the vehicle 55 to the destination.

Next, the server control unit 350 refers to the map data 333 and accordingly searches for a walking route in the case of traveling by walk from the position of the terminal apparatus 10 to the parking space of the vehicle 55 (step T10). The server control unit 350 also calculates an estimated time required in the case of traveling by walk by following the discovered walking route. Step T10 corresponds to a "second search step", a "second calculation step", a "second search procedure", and a "second calculation procedure" of the present invention. In addition, the estimated time required in the case of traveling by walk by following the walking route corresponds to a "second estimated time" of the present invention. The server control unit 350 determines whether information about the driving route for which a search has been requested and the estimated time required has been received from the on-board apparatus 50 (step T11). When the information about the driving route and the estimated time required has not been received (NO in step T11), the server control unit 350 waits to perform a subsequent processing or determination until the information about the driving route is received.

When the information about the driving route has been received from the on-board apparatus 50 (YES in step T11), the server control unit 350 transmits to the terminal apparatus 10 the received information about the driving route and the estimated time required and the information about the walking route discovered in step T10 and the estimated time required (step T12).

Next, the server control unit 350 determines whether information about a selection of travel route has been received from the terminal apparatus 10 (step T13). When the information about a selection of travel route has not been received (NO in step T13), the server control unit 350 waits to perform a subsequent processing or determination until the information about a selection of travel route is received. When the information about a selection of travel route has been received (YES in step T13), the server control unit 350 determines whether the driving route is selected as a travel route (step T14).

When not the driving route but the walking route is selected as a travel route (NO in step T14), the server control unit 350 causes the terminal apparatus 10 to display the walking route and instructs the terminal apparatus 10 to start guidance, and consequently, the server control unit 350 ends this processing flow. When the driving route is selected as a travel route (YES in step T14), the server control unit 350 instructs the on-board apparatus 50 to start automated driving (step T15). Step T15 corresponds to an "instruction step" and an "instruction procedure" of the present invention.

Next, the server control unit 350 determines whether an imaging request is received from the terminal apparatus 10 (step T16). When an imaging request is received (YES in step T16), the server control unit 350 instructs the on-board apparatus 50 to capture an image (step T17) and subsequently determines whether imaging data has been received from the on-board apparatus 50 (step T18). When imaging data has not been received from the on-board apparatus 50 (NO in step T18), the server control unit 350 waits to perform a subsequent processing or determination until imaging data is received.

When imaging data has been received from the on-board apparatus 50 (YES in step T18), the server control unit 350 transmits the received imaging data to the terminal apparatus 10 (step T19). When an imaging request is not received (NO in step T16) or when the processing in step T19 is completed, the server control unit 350 determines whether a request to cancel the exit from the parking is received (step T20).

When a request to cancel the exit from the parking is received (YES in step T20), the server control unit 350 inquires about whether the vehicle 55 has started automated driving (step T21). When the vehicle 55 has not started automated driving (NO in step T21), the server control unit 350 moves to the determination in step T24. When the vehicle 55 has started automated driving (YES in step T21), the server control unit 350 instructs the on-board apparatus 50 to stop automated driving (step T22).

Afterward, the server control unit 350 waits until information indicating a result of whether automated driving is canceled is received from the on-board apparatus 50 (step T23). When information indicating a result has not been received (NO in step T23), the server control unit 350 waits until information indicating a result is received. When information indicating a result has been received (YES in step T23), the server control unit 350 determines whether the received result is information indicating that automated driving is canceled (step T24).

When the received result is information indicating that automated driving is canceled (YES in step T24), the server control unit 350 notifies the terminal apparatus 10 that automated driving is canceled (step T25) and ends this processing flow. When the received result is information indicating that automated driving cannot be canceled (NO in step T24), the server control unit 350 notified the terminal apparatus 10 that automated driving cannot be canceled (step T26). Subsequently, the server control unit 350 moves to a determination in step T27.

When a request to cancel the exit from the parking is not received (NO in step T20) or the processing in step T26 is completed, the server control unit 350 determines whether a notification indicating that it is impossible to reach the destination is received from the on-board apparatus 50 (step T27). When a notification indicating that it is impossible to reach the destination is received from the on-board apparatus 50 (YES in step T27), the server control unit 350 searches for a walking route (step T28). The server control unit 350 receives position information from the on-board apparatus 50 and searches for a walking route for traveling by walk from the position of the terminal apparatus 10 received from the terminal apparatus 10 in step T6 to the position of the on-board apparatus 50 (step T28).

Also, in step T28, the server control unit 350 may receive the position information from the on-board apparatus 50, refer to the type data included in the map data 333, and accordingly determine whether the parking is a surface parking lot or a multilevel parking lot. In the case of the multilevel parking lot, the server control unit 350 may specify the number of level at which the vehicle 55 is situated by comparing the position received from the on-board apparatus 50 and the approach road data and transmit to the terminal apparatus 10 the number of level in the multilevel parking lot and a parking map of the level of the number.

Additionally, the server control unit 350 notifies the terminal apparatus 10 that the vehicle 55 cannot reach the destination by automated driving (step T29). The server control unit 350 then transmits to the terminal apparatus 10 the walking route discovered in step T28 and the imaging data of the camera 550 received from the server apparatus 30 (step T30).

When a notification indicating that it is impossible to reach the destination is not received from the on-board apparatus 50 (NO in step T27), the server control unit 350 determines whether position information is received from the on-board apparatus 50 (step T31). When position information is not received from the on-board apparatus 50 (NO in step T31), the server control unit 350 moves to step T16 and repeats the processing operations in step T16 and the following steps again. When position information is received from the on-board apparatus 50 (YES in step T31), the server control unit 350 determines, in accordance with the received position information, whether the vehicle 55 has reached the destination (step T32). When the vehicle 55 has not reached the destination (NO in step T32), the server control unit 350 moves to step T16 and repeats the processing operations in step T16 and the following steps again. When the vehicle 55 has reached the destination (YES in step T32), the server control unit 350 notifies the terminal apparatus 10 of arrival at the destination (step T33) and consequently ends this processing flow.

Figure 13:
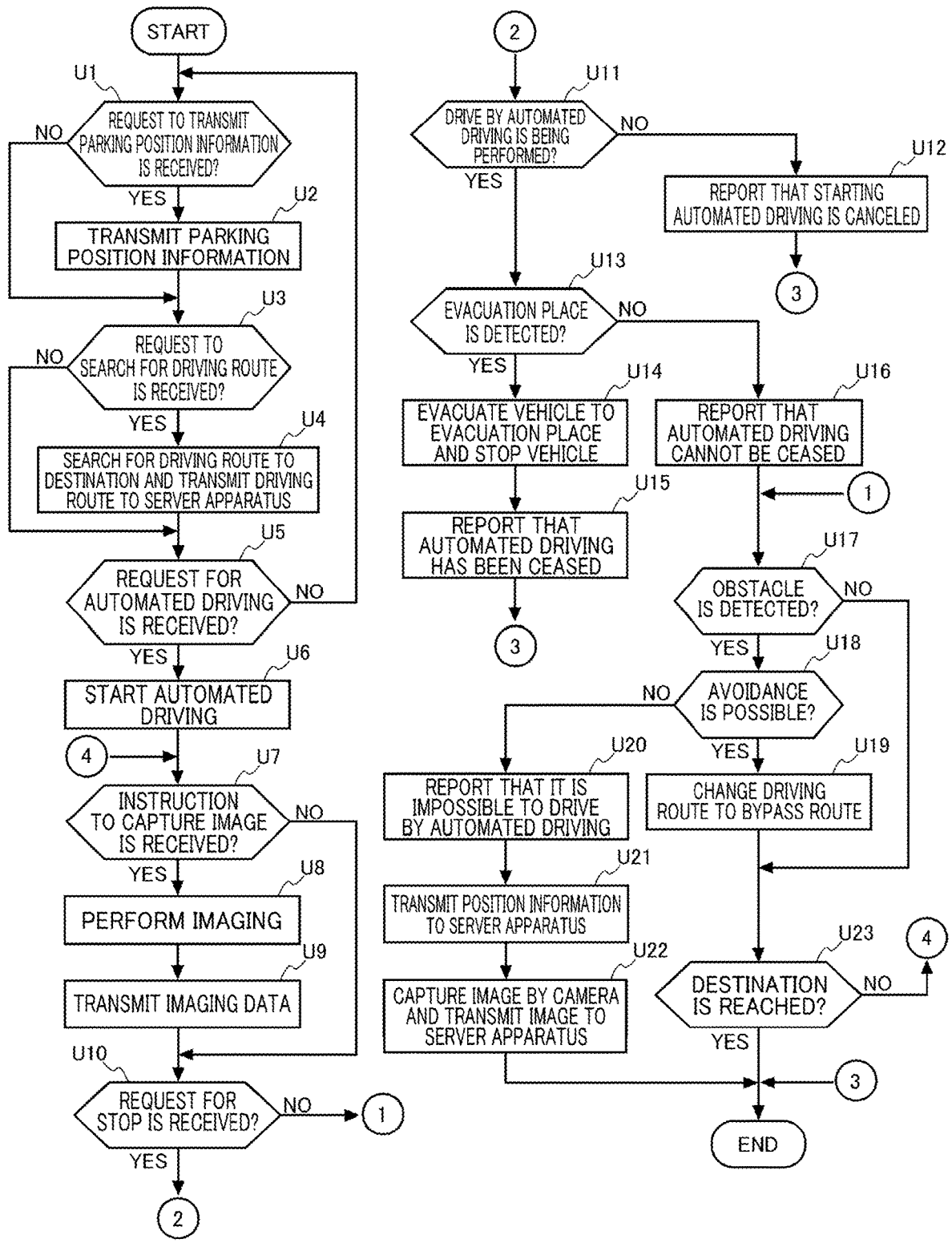
FIG. 13 is a flowchart illustrating an operation of the on-board apparatus.

FIG. 13 is a flowchart illustrating an operation of the on-board apparatus 50.

The operation of the on-board apparatus 50 is described with reference to the flowchart illustrated in FIG. 13.

The on-board control unit 590 firstly determines whether a request to transmit parking position information is received from the server apparatus 30 (step U1). When no request to transmit parking position information is received (NO in step U1), the on-board control unit 590 moves to a determination in step U3. When a request to transmit parking position information is received (YES in step U1), the on-board control unit 590 obtains position information from the GPS reception unit 520 and transmits the obtained position information as parking position information to the server apparatus 30 (step U2).

Next, the on-board control unit 590 determines whether a request to search for a driving route is received (step U3). When no request to search for a driving route is received (NO in step U3), the on-board control unit 590 moves to a determination in step U5. When a request to search for a driving route is received (YES in step U3), the on-board control unit 590 searches for a driving route in the case of driving by automated driving from the position of the vehicle 55 to the received destination and an estimated time required in the case of driving by automated driving by following the driving route. The on-board control unit 590 transmits the discovered driving route and estimated time required to the server apparatus 30 (step U4). Step U4 corresponds to a "first search step", a "first calculation step", a "first search procedure", and "a first calculation procedure" of the present invention. In addition, the estimated time required in the case of driving by automated driving by following the driving route corresponds to a "first estimated time" of the present invention.

Next, the on-board control unit 590 determines whether a request to start automated driving by following the discovered driving route is received from the server apparatus 30 (step U5). When no request to start automated driving is received from the server apparatus 30 (NO in step U5), the on-board control unit 590 returns to step U1 and determines whether a request to transmit parking position information is received from the server apparatus 30. When a request to start automated driving is received from the server apparatus 30 (YES in step U5), the on-board control unit 590 starts automated driving and causes the vehicle 55 to drive along the driving route discovered in step U4 (step U6).

Next, the on-board control unit 590 determines whether an instruction to capture an image is received from the server apparatus 30 (step U7). When no instruction to capture an image is received (NO in step U7), the on-board control unit 590 moves to a determination in step U10. When an instruction to capture an image is received (YES in step U7), the on-board control unit 590 causes the camera 550 to perform imaging (step U8) and then transmits the imaging data generated by the camera 550 to the server apparatus 30 (step U9).

Next, the on-board control unit 590 determines whether a request to stop automated driving is received (step U10). When no request to stop automated driving is received (NO in step U10), the on-board control unit 590 moves to a determination in step U17. When a request to stop automated driving is received (YES in step U10), the on-board control unit 590 determines whether the vehicle 55 is driving by automated driving (step U11).

When the vehicle 55 is not driving by automated driving (NO in step U11), the on-board control unit 590 cancels control of automated driving and notifies the server apparatus 30 that starting automated driving is canceled (step U12). When the vehicle 55 is driving by automated driving (YES in step U11), the on-board control unit 590 determines, in accordance with the imaging data of the camera 550 and the map data 591b, whether there is an evacuation place to which the vehicle 55 can be evacuated (step U13). The on-board control unit 590 detects an open parking space or an available space at which the vehicle 55 can be parked.

When an evacuation place is detected (YES in step U13), the on-board control unit 590 evacuates the vehicle 55 to the detected evacuation place and stops the vehicle 55 (step U14). Subsequently, the on-board control unit 590 ceases the control of automated driving, transmits to the server apparatus 30 a notification indicating that automated driving has been ceased (step U15), and ends this processing flow.

When no evacuation place is detected (NO in step U13), the on-board control unit 590 notifies the server apparatus 30 that automated driving cannot be ceased (step U16) and maintains automated driving. The on-board control unit 590 subsequently determines whether an obstacle in the travel direction of the vehicle 55 is detected by the surroundings detection sensor 530 (step U17). When no obstacle is detected (NO in step U17), the on-board control unit 590 moves to a determination in step U23.

When an obstacle is detected (YES in step U17), the on-board control unit 590 determines whether it is possible to avoid the obstacle by automated driving (step U18). For example, the on-board control unit 590 searches for a bypass route for bypassing an obstacle. When a bypass route can be detected, the on-board control unit 590 determines that it is possible to avoid the obstacle (YES in step U18). When no bypass route can be detected, the on-board control unit 590 determines that it is impossible to avoid the obstacle (NO in step U18).

When it is impossible to avoid the obstacle (NO in step U18), the on-board control unit 590 notifies the server apparatus 30 that it is impossible to drive by automated driving (step U20) and the on-board control unit 590 transmits to the server apparatus 30 position information indicating a parking position at which the vehicle 55 is parked (step U21). The on-board control unit 590 also causes the camera 550 to perform imaging and causes the camera 550 to capture an image in the forward direction that is the travel direction of the vehicle 55. The on-board control unit 590 transmits the imaging data generated by the camera 550 to the server apparatus 30 (step U22) and ends this processing flow.

When it is possible to avoid the obstacle (YES in step U18), the on-board control unit 590 newly sets the detected bypass route as a driving route by automated driving (step U19) and maintains the drive by automated driving. Afterward, the on-board control unit 590 determines whether the vehicle 55 has reached the destination (step U23). When the vehicle 55 has not reached the destination (NO in step U23), the on-board control unit 590 moves to step U7 and repeats the processing operations in step U7 and the following steps again. When the vehicle 55 has reached the destination (YES in step U23), the on-board control unit 590 ends this processing flow.

As described above, the present embodiment implements the first search step, the first calculation step, the second search step, the second calculation step, the display step, the acceptance step, and the instruction step.

The first search step is a step that is implemented by the on-board apparatus 50 and in which a driving route from the parking space of the vehicle 55 to a set destination is searched for.

The first calculation step is a step that is implemented by the on-board apparatus 50. In the first calculation step, an estimated time required to reach the destination in the case in which the vehicle 55 drives by following the discovered driving route is calculated.

The second search step is a step that is implemented by the server apparatus 30 and in which a walking route in the case of traveling by walk from the position of the terminal apparatus 10 to the parking space of the vehicle 55 is searched for.

The second calculation step is a step that is implemented by the server apparatus 30 and in which an estimated time required to reach the parking space of the vehicle 55 in the case of walking by following the discovered walking route is calculated.

The display step is a step implemented by the terminal apparatus 10 and in which the driving route and the estimated time required, and the walking route and the estimated time required, which are received from the server apparatus 30, are displayed at the display panel 141.

The acceptance step is a step that is implemented by the terminal apparatus 10 and in which a selection of either the driving route or the walking route is accepted.

The instruction step is a step that is implemented by the terminal apparatus 10 and in which, when in the acceptance step a selection of the driving route is accepted, an instruction to start driving by automated driving is provided for the vehicle 55.

As a result, at the display panel 141 of the terminal apparatus 10, a driving route from the parking space of the vehicle 55 to the destination, an estimated time required for the driving route, a walking route from the position of the terminal apparatus 10 to the parking space of the vehicle 55, and an estimated time required for the walking route are displayed. This enables the user to check the display at the display panel 141 and select the driving route or the walking route in accordance with the estimated time required.

In addition, when the driving route is selected, it is possible to cause the vehicle 55 to start automated driving without performing an operation to order the start of automated driving.

Furthermore, in the present embodiment, the terminal apparatus 10 implements the selection step of selecting as a recommended route either the driving route or the walking route.

When the terminal apparatus 10 implements the display step, the terminal apparatus 10 differentiates the display appearance of the driving route or the walking route that is selected in the selection step from the display appearance of the walking route or the driving route that is not selected in the selection step.

As a result, the recommended route displayed at the display panel 141 and the route not selected as a recommended route are clearly distinguished from each other.

Further, when the difference between the estimated time required for the walking route and the estimated time required for the driving route is greater than a preset time, the walking route is selected as a recommended route.

As a result, in the case in which it takes relatively long to exit from the parking by automated driving, it is possible to select the manner in which the user travels by walk to the parking space of the vehicle and the vehicle is caused to exit from the parking by user's drive.

Moreover, when the walking distance by following the walking route is longer than a preset distance, the driving route is selected.

This enables the user not to travel a long distance by walk.

Furthermore, in the case in which the parking space of the vehicle is a multilevel parking lot, when the parking level of the vehicle is higher than a preset parking level, the driving route is selected.

This enables the user not to travel to a relatively high level in the multilevel parking lot.

Further, either the driving route or the walking route is selected in accordance with the criterion of environment including at least one of the weather and the temperature.

This enables the user not to travel by walk in, for example, rainy weather. Additionally, this enables the user not to travel by walk when the outside-air temperature is a relatively high or low temperature.

Second Embodiment

Next, a second embodiment is described.

In the first embodiment, the server apparatus 30 searches for a walking route; the on-board apparatus 50 searches for a driving route; and these travel routes are transmitted to the terminal apparatus 10. In the second embodiment, the terminal apparatus 10 searches for a walking route and a driving route, and in accordance with the discovered walking route, an estimated time required for the walking route, the driving route, and an estimated time required for the driving route, the terminal apparatus 10 selects either the walking route or the driving route as a recommended route.

Figure 14:
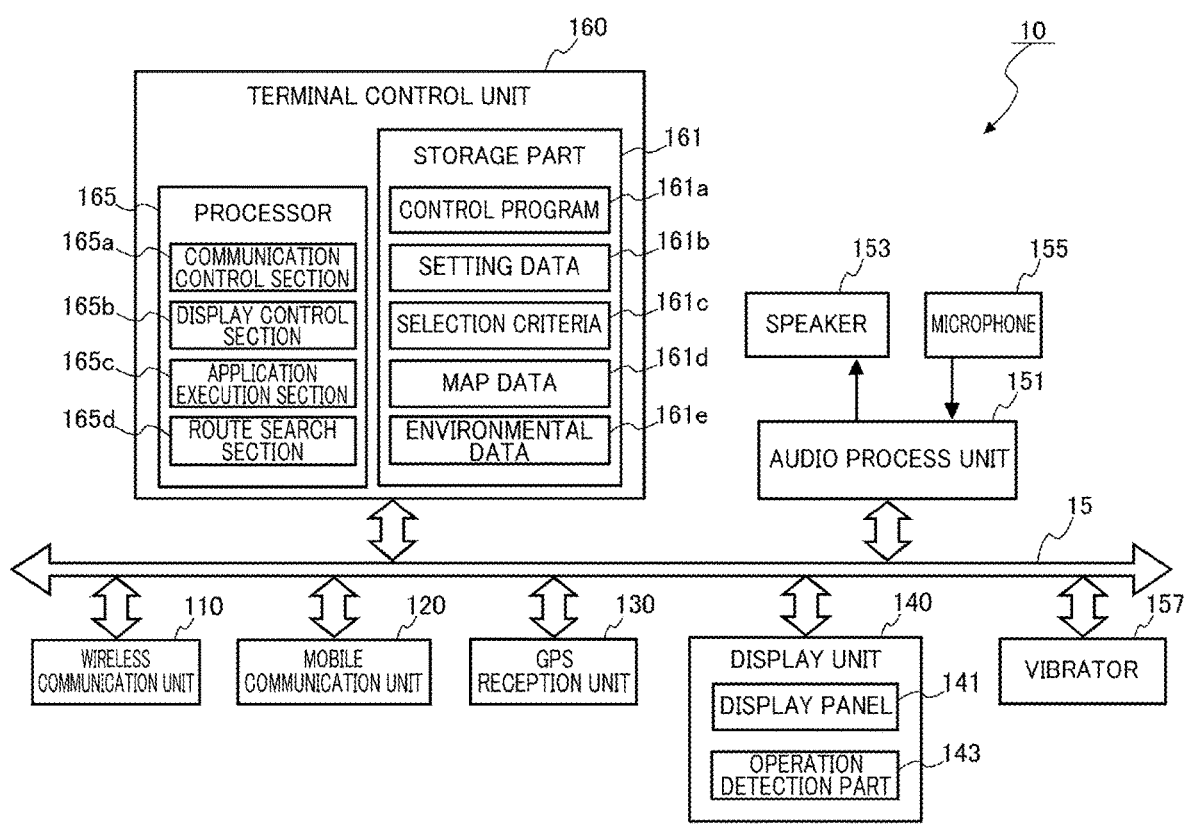
FIG. 14 is a block diagram illustrating a configuration of a terminal apparatus of a second embodiment.

FIG. 14 is a block diagram illustrating a configuration of the terminal apparatus 10 of the second embodiment.

In the terminal apparatus 10 of the second embodiment, map data 161d and environmental data 161e are stored in the storage part 161. The processor 165 of the terminal control unit 160 functions as a route search section 165d. The route search section 165d corresponds to an example of a "first calculator", a "second calculator", and a "selection unit" of the present invention.

After the exit parking assistance app is started, the route search section 165d performs data communication with the on-board apparatus 50 and receives from the on-board apparatus 50 position information indicating the parking space of the vehicle 55. The route search section 165d accepts the setting of a destination by using a touch input. The route search section 165d then calculates, in accordance with a known program for searching for a route, a driving route from the parking space of the vehicle 55 to the destination and an estimated time required in the case of driving by automated driving by following the driving route. In addition, the route search section 165d obtains from the GPS reception unit 130 position information about the terminal apparatus 10 and calculates a walking route from the position of the terminal apparatus 10 to the parking space of the vehicle 55 and an estimated time required in the case of traveling by walk by following the walking route.

Similarly to the first embodiment described above, the route search section 165d selects either the driving route or the walking route as a recommended route in accordance with the driving route from the parking space of the vehicle 55 to the destination, the estimated time required for the driving route, the walking route from the position of the terminal apparatus 10 to the parking space of the vehicle 55, and the estimated time required for the walking route. The terminal apparatus 10 of the second embodiment is also able to display, as a recommended route, a manner in which it is possible to efficiently cause the vehicle 55 to exit from the parking. The manner is one of the manner in which the vehicle exits from the parking by automated driving and the manner in which the user travels by walk to the parking space of the vehicle and the vehicle exits from the parking by user's drive.

The terminal apparatus 10 causes the display panel 141 to display the driving route, the estimated time required for the driving route, the walking route, and the estimated time required for the walking route. The terminal apparatus 10 also displays one travel route selected as a recommended route in a display appearance different from the display appearance of the other travel route that is not selected.

When the walking route is selected, the terminal apparatus 10 starts route guidance by following the walking route that is selected. In contrast, when the driving route is selected, the terminal apparatus 10 transmits to the on-board apparatus 50 instruction information for ordering the start of automated driving. Upon reception of the instruction information from the terminal apparatus 10, the on-board apparatus 50 starts automated driving and causes the vehicle 55 to drive by automated driving to reach the destination. As a result, the on-board apparatus 50 can cause the vehicle 55 to start automated driving without performing an operation to order the start of automated driving.

In the terminal apparatus 10, either the walking route or the driving route may be selected in accordance with the walking route and the estimated time required for the walking route, and the driving route and the estimated time required for the driving route and a selected travel route and an estimated time required for the travel route may be displayed at the display panel 141.

The embodiments described above each exemplify one aspect of the present invention and any modification and application may be made without departing from the scope of the present invention.

For example, when a setting of a position to enter the vehicle is accepted after the user leaves the vehicle 55, a driving route from the parking space to a set position to enter the vehicle and a time required to travel from the parking space to the position to enter the vehicle may be reported by the server apparatus 30 to the terminal apparatus 10 and displayed at the display unit 140 of the terminal apparatus 10. When a user's operation is accepted, the server apparatus 30 may search for a walking route for walking from the position of the terminal apparatus 10 to the position to enter the vehicle and the terminal apparatus 10 may be caused to display the discovered walking route and a time required to travel along the route.

It is assumed that the user leaves the vehicle 55 at a pickup and drop-off point such as a shopping mall and the vehicle 55 detects an available space in the parking and is parked at the available space by automated driving. In this case, when parking the vehicle 55 is completed, the parking space of the vehicle 55 and a time required in the case of driving by automated driving and traveling to a pickup and drop-off position may be reported to the terminal apparatus 10. In addition, the terminal apparatus 10 may be caused to display, for example, information of time in which traffic jams would occur and information about the weather.

The functional blocks of the terminal apparatus 10 depicted in FIG. 2, the server apparatus 30 depicted in FIG. 5, and the on-board apparatus 50 depicted in FIG. 8 are illustrated in schematic diagrams in which functions included in the terminal apparatus 10, the server apparatus 30, and the on-board apparatus 50 are grouped in accordance with main processing specifics. The configuration of the terminal apparatus 10, the configuration of the server apparatus 30, and the configuration of the on-board apparatus 50 can be divided into more blocks in accordance with processing specifics. The functional block may be constructed to perform more processing operations than one block indicated in FIG. 2, FIG. 5, and FIG. 8. The processing of each block may be performed by a single hardware device or a plurality of hardware devices. The processing of each block may be implemented by a single program or a plurality of programs.

The control program installed in each of the terminal apparatus 10, the server apparatus 30, and the on-board apparatus 50 may be, for example, downloaded from another server apparatus in the communication network 5, loaded in to a RAM, and then run by the processor.

The processing units in the flowchart illustrated in FIG. 9 are determined by division based on the main processing contents for ease of understanding the processing of the terminal control unit 160 of the terminal apparatus 10 and the present invention is not limited by the method of division of processing units or the names of the processing units. Similarly, the processing units in the flowcharts illustrated in FIGS. 10 to 12 are determined by division based on the main processing contents for ease of understanding the processing of the server control unit 350 of the server apparatus 30 and the present invention is not limited by the method of division of processing units or the names of the processing units. Similarly, the processing units in the flowchart illustrated in FIG. 13 are determined by division based on the main processing contents for ease of understanding the processing of the on-board control unit 590 of the on-board apparatus 50 and the present invention is not limited by the method of division of processing units or the names of the processing units.

The processing of the terminal control unit 160, the processing of the server control unit 350, and the processing of the on-board control unit 590 may be divided in more processing units in accordance with processing specifics or may be divided into processing units in a manner in which one processing unit includes more processing operations. The processing order in each of the flowcharts described above is also not limited to the examples illustrated in the drawings.

In the case in which the method for selecting a route is implemented by a computer, a program that is run by the computer may be configured as a storage medium or a transfer medium that transfers the program. As the storage medium, a magnetic optical storage medium or a semiconductor memory device may be applied. Specifically, examples of the storage medium include a flexible disk, an HDD (Hard Disk Drive), a CD-ROM (Compact Disk Read Only Memory), a DVD, a Blu-ray Disc, and a magneto-optical disk. Blu-ray is a registered trademark. As examples of the storage medium, a portable storage medium, such as a flash memory or a card-type storage medium, and a stationary storage medium are included. The storage medium may be a non-volatile storage device, such as a RAM, a ROM, or an HDD, which is an internal storage device included in the server apparatus 30.

REFERENCE SIGNS LIST

1 guidance system
5 communication network
10 terminal
30 server apparatus
50 on-board apparatus
55 vehicle
110 wireless communication unit
120 mobile communication unit
130 GPS reception unit
140 display unit
153 speaker
157 vibrator
160 terminal control unit
161 storage part
165 processor
165*a* communication control section
165*b* display control section
165*c* application execution section
310 communication unit
330 storage unit
350 server control unit
351 communication control part
353 table management part
355 authentication part
357 route search part
510 wireless communication unit
520 GPS reception unit
530 surroundings detection sensor
540 vehicle sensor
550 camera
560 display unit
561 display panel
563 operation detection part
571 audio output unit
573 speaker
581 steering device
583 propulsion device
585 transmission device
587 brake device
590 on-board control unit
591 storage part
591*a* control program
591*b* map data
595 processor
595*a* communication control section
595*b* position specification section
595*c* route search section
595*d* surroundings detection section
595*e* display control section
595*f* vehicle control section

The invention claimed is:

1. A method for selecting a route, comprising:
   an operation to start exiting from a parking acceptance step of operating an autonomous vehicle to start exiting from a parking space via a terminal apparatus owned by a user;
   a parking position information obtaining step of obtaining information indicating a location of the parking space from an on-board apparatus of the autonomous vehicle when accepting the operation to start exiting from a parking as a trigger;
   a terminal position information obtaining step of obtaining terminal position information indicating a present location of the terminal apparatus;
   a first search step of searching an automated driving route of an autonomous vehicle, the automated driving route being from the parking space of the autonomous vehicle to the present location of the terminal apparatus;
   a first calculation step of calculating a first estimated time to reach the present location of the terminal apparatus in a case in which the autonomous vehicle drives by following the automated driving route;
   a second search step of searching a walking travel route in a case of traveling by walk from the present location of the terminal apparatus to the parking space;
   a second calculation step of calculating a second estimated time to reach the parking space of the autonomous vehicle in a case of walking by following the walking travel route;
   a display step of displaying at a display the automated driving route and the first estimated time, and the walking travel route and the second estimated time, and presenting both of the first estimated time and the second estimated time to the user;

an acceptance step of accepting a selection of either the automated driving route or the walking travel route by operating the terminal apparatus of the user; and an instruction step of instructing the autonomous vehicle to start driving by automated driving when the selection of the automated driving route is accepted, wherein the parking position information obtaining step includes the steps of obtaining an on-board apparatus ID identifying the on-board apparatus of the autonomous vehicle stored in a memory in advance with respect to a terminal ID identifying the terminal apparatus, requesting the on-board apparatus of the obtained on-board ID to transmit vehicle position information indicating a present location, and recognizing the location of the parking space based on the vehicle position information uploaded from the on-board apparatus, and the second search step includes the step of searching the walking travel route to the parking space of the autonomous vehicle based on the present location of the terminal apparatus and the location of the recognized parking space.

2. The method for selecting a route according to claim 1, further comprising:
a selection step of selecting as a recommended route either the automated driving route or the walking travel route, wherein
the display step includes differentiating a display appearance of the automated driving route or the walking travel route that is selected in the selection step from a display appearance of the walking travel route or the automated driving route that is not selected in the selection step.

3. The method for selecting a route according to claim 2, wherein the selection step includes selecting the walking travel route when a difference between the second estimated time and the first estimated time is greater than a preset time.

4. The method for selecting a route according to claim 2, wherein the selection step includes selecting the automated driving route when a walking distance by following the walking travel route is longer than a preset distance.

5. The method for selecting a route according to claim 2, wherein the selection step including selecting the automated driving route when a parking level of the autonomous vehicle is higher than a preset parking level in a case in which a parking location of the autonomous vehicle is a multilevel parking lot.

6. The method for selecting a route according to claim 2, wherein the selection step includes selecting either the automated driving route or the walking travel route in accordance with a criterion of environment including at least one of weather and outside-air temperature.

7. The method for selecting a route according to claim 1, wherein while the autonomous vehicle drives by automated driving following the driving route, when failure occurs in the autonomous vehicle or when an obstacle is present in the travel direction of the autonomous vehicle and the obstacle blocks the travel of the autonomous vehicle, the present position information indicating a present location of the autonomous is obtained from the on-board apparatus, and the display step includes the step of displaying a cause that it is impossible to drive by automated driving, and displaying the walking travel route from the present location of the terminal apparatus to the present location of the autonomous vehicle at the display of the terminal apparatus.

8. A terminal apparatus, comprising:
a processor and a display,
wherein the processor
accepts an operation of an autonomous vehicle to start exiting from a parking space;
obtains information indicating a location of the parking space from an on-board apparatus of the autonomous vehicle when accepting the operation to start exiting from a parking as a trigger;
obtains terminal position information indicating a present location of the terminal apparatus;
calculates an automated driving route of the autonomous vehicle, the automated driving route being from the parking space to the present location of the terminal apparatus, and that calculates a first estimated time in which the autonomous vehicle reaches the present location of the terminal apparatus in a case in which the autonomous vehicle drives by following the automated driving route;
calculates a walking travel route in a case of traveling by walk from a location of the terminal to the parking space and that calculates a second estimated time to reach the parking space in a case of walking by following the walking travel route;
displays the automated driving route and the first estimated time, and the walking travel route and the second estimated time at the display, and presents both of the first estimated time and the second estimated time to the user;
accepts a selection of either the automated driving route or the walking travel route which is selected by the user;
transmits instruction information for instructing the autonomous vehicle to start driving by automated driving when the acceptor accepts a selection of the automated driving route, and
wherein the processor obtains an on-board apparatus ID identifying the on-board apparatus of the autonomous vehicle stored in a memory in advance with respect to a terminal ID identifying the terminal apparatus, requests the on-board apparatus of the obtained on-board ID to transmit vehicle position information indicating a present location, and recognizes the location of the parking space based on the vehicle position information uploaded from the on-board apparatus, and
the processor searches the walking travel route to the parking space of the autonomous vehicle based on the present location of the terminal apparatus and the location of the recognized parking space.

9. A non-transitory computer readable medium including computer program that causes a computer to execute a process, the process comprising:
an operation to start exiting from a parking acceptance procedure of operating an autonomous vehicle to start exiting from a parking space via a terminal apparatus owned by a user;
a parking position information obtaining procedure of obtaining information indicating a location of the parking space from an on-board apparatus of the autonomous vehicle when accepting the operation to start exiting from a parking as a trigger;
a terminal position information obtaining procedure of obtaining terminal position information indicating a present location of the terminal apparatus;
a first search procedure of searching an automated driving route of an autonomous vehicle, the automated driving route being from a parking space of the autonomous vehicle to a present location of the terminal apparatus that is set;

a first calculation procedure of calculating a first estimated time to reach the present location of the terminal apparatus in a case in which the autonomous vehicle drives by automated driving by following the automated driving route;

a second search procedure of searching a walking travel route in a case of traveling by walk from a location of a terminal to the parking space;

a second calculation procedure of calculating a second estimated time to reach the parking space of the autonomous vehicle in a case of walking by following the walking travel route;

a display procedure of displaying the automated driving route and the first estimated time, and the walking travel route and the second estimated time at a display, and presents both of the first estimated time and the second estimated time to the user;

an acceptance procedure of accepting a selection of either the automated driving route or the walking travel route by operating the terminal apparatus of the user; and an instruction procedure of instructing the autonomous vehicle to start driving by automated driving when the selection of the automated driving route is accepted, wherein the parking position information obtaining procedure includes the procedures of obtaining an on-board apparatus ID identifying the on-board apparatus of the autonomous vehicle stored in a memory in advance with respect to a terminal ID identifying the terminal apparatus, requesting the on-board apparatus of the obtained on-board ID to transmit vehicle position information indicating a present location, and recognizing the location of the parking space based on the vehicle position information uploaded from the on-board apparatus, and the second search procedure includes the procedure of searching the walking travel route to the parking space of the autonomous vehicle based on the present location of the terminal apparatus and the location of the recognized parking space.

* * * * *